US009929834B2

United States Patent
Chen et al.

(10) Patent No.: US 9,929,834 B2
(45) Date of Patent: Mar. 27, 2018

(54) LOW LATENCY OPERATION WITH DIFFERENT HYBRID AUTOMATIC REPEAT REQUEST (HARQ) TIMING OPTIONS

(71) Applicant: QUALCOMM Incorporated, San Diego, CA (US)

(72) Inventors: Wanshi Chen, San Diego, CA (US); Hao Xu, San Diego, CA (US); Shimman Arvind Patel, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 15/087,693

(22) Filed: Mar. 31, 2016

(65) Prior Publication Data

US 2016/0323070 A1 Nov. 3, 2016

Related U.S. Application Data

(60) Provisional application No. 62/153,889, filed on Apr. 28, 2015.

(51) Int. Cl.
*H04L 1/18* (2006.01)
*H04W 56/00* (2009.01)
*H04W 74/08* (2009.01)

(52) U.S. Cl.
CPC .......... *H04L 1/1861* (2013.01); *H04L 1/1887* (2013.01); *H04L 1/1896* (2013.01); *H04W 56/0045* (2013.01); *H04W 74/0833* (2013.01)

(58) Field of Classification Search
CPC ....... H04L 1/18; H04L 1/1861; H04L 1/1864; H04L 1/1887; H04L 1/1896;
(Continued)

(56) References Cited

U.S. PATENT DOCUMENTS 8,266,491 B2 * 9/2012 Lee .................. H04L 1/1812
714/748
8,934,459 B2 * 1/2015 Marinier ............ H04L 5/001
370/336
(Continued)

FOREIGN PATENT DOCUMENTS

WO WO-2009134100 A2 11/2009

OTHER PUBLICATIONS

ISA/EP, International Search Report and Written Opinion of the International Searching Authority, Int'l. App. No. PCT/US2016/025678, dated Jul. 1, 2016, European Patent Office, Rijswijk, NL, 15 pgs.

*Primary Examiner* — Tri H Phan
(74) *Attorney, Agent, or Firm* — Holland & Hart LLP

(57) ABSTRACT

Methods, systems, and devices for wireless communication are described. A user equipment (UE) or a base station may identify a timing advance parameter and a processing parameter for the UE, and one or both may determine a hybrid automatic repeat request (HARQ) timing based on the identified parameters. For example, if the UE has a large timing advance or reduced processing capacity, a longer HARQ timing may be chosen. When the UE receives downlink (DL) transmissions from the base station, the UE may send an acknowledgement (ACK) or negative acknowledgement (NACK) based on the chosen HARQ timing. The base station may send a retransmission (in the case of a NACK) based on the HARQ timing. In some cases, the UE may request a specific HARQ timing, or request an updated timing advance. If HARQ synchronization is lost, the UE and the base station may default to a preconfigured HARQ timing.

24 Claims, 17 Drawing Sheets

(58) Field of Classification Search
CPC ............... H04L 5/0055; H04W 56/00; H04W 56/0045; H04W 72/04; H04W 74/08; H04W 74/0833
See application file for complete search history.

(56) References Cited

U.S. PATENT DOCUMENTS

| | | | |
|---|---|---|---|
| 9,210,675 B2* | 12/2015 | Dinan | ............... H04W 56/0005 |
| 9,288,028 B2* | 3/2016 | Yang | ..................... H04L 1/1854 |
| 2009/0046641 A1* | 2/2009 | Wang | ................. H04W 74/002 |
| | | | 370/329 |
| 2010/0265904 A1 | 10/2010 | Yang et al. | |
| 2013/0188617 A1* | 7/2013 | Dinan | ............... H04W 56/0005 |
| | | | 370/336 |
| 2014/0098761 A1* | 4/2014 | Lee | ..................... H04W 74/006 |
| | | | 370/329 |
| 2014/0126497 A1* | 5/2014 | Xu | ...................... H04W 74/002 |
| | | | 370/329 |
| 2014/0133430 A1 | 5/2014 | Yang et al. | |
| 2014/0241272 A1* | 8/2014 | Griot | ................ H04W 74/0833 |
| | | | 370/329 |
| 2014/0241318 A1* | 8/2014 | Zhong | ............... H04W 74/0833 |
| | | | 370/331 |
| 2016/0270071 A1* | 9/2016 | Dinan | .................... H04L 5/001 |
| 2017/0325220 A1* | 11/2017 | Li | ..................... H04W 72/0413 |
| 2017/0353273 A1* | 12/2017 | Zhang | .................. H04L 1/1671 |

\* cited by examiner

LOW LATENCY OPERATION WITH DIFFERENT HYBRID AUTOMATIC REPEAT REQUEST (HARQ) TIMING OPTIONS

CROSS REFERENCES

The present Application for Patent claims priority to U.S. Provisional Patent Application No. 62/153,889 by Chen, et al., entitled "Low Latency Operation with Different Hybrid Automatic Repeat Request (HARQ) Timing Options," filed Apr. 28, 2015, assigned to the assignee hereof.

BACKGROUND

The following relates generally to wireless communication, and more specifically to low latency operation with different hybrid automatic repeat request (HARQ) timing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a base station and a UE may operate based on a low latency physical (PHY) layer timing structure. Low latency operations (for example, operations based on a reduced transmission time interval (TTI)) may enable a reduction in the delay between a transmission and a HARQ response. However, the reduced delay may also reduce the time available for a UE to process a transmission and determine a response. For UEs with a large propagation delay (and hence, a large timing advance) this reduced processing time may not be sufficient.

SUMMARY

A user equipment (UE) or a base station, or both, may identify a timing advance parameter and a processing parameter for the UE and determine a hybrid automatic repeat request (HARQ) timing to the identified parameters. For example, if the UE has a large timing advance or reduced processing capacity, a longer HARQ timing may be chosen. When the UE receives downlink (DL) transmissions from the base station, the UE may send an acknowledgement (ACK) or negative acknowledgement (NACK) based on the chosen HARQ timing. The base station may then send a retransmission (in the case of a NACK) based on the HARQ timing. In some cases the UE may request a specific HARQ timing, or request an updated timing advance. If HARQ synchronization is lost, the UE and the base station may default to a preconfigured HARQ timing which may be based on a large timing advance.

A method of wireless communication is described. The method may include identifying a timing advance parameter and a processing parameter associated with a UE, determining a HARQ timing based at least in part on the timing advance parameter or the processing parameter, or both, and transmitting a HARQ response message based at least in part on the HARQ timing.

An apparatus for wireless communication is described. The apparatus may include means for identifying a timing advance parameter and a processing parameter associated with a UE, means for determining a HARQ timing based at least in part on the timing advance parameter or the processing parameter, or both, and means for transmitting a HARQ response message based at least in part on the HARQ timing.

A further apparatus for wireless communication is described. The apparatus may include a processor, memory in electronic communication with the processor, and instructions stored in the memory and operable, when executed by the processor, to cause the apparatus to identify a timing advance parameter and a processing parameter associated with a UE, determine a HARQ timing based at least in part on the timing advance parameter or the processing parameter, or both, and transmit a HARQ response message based at least in part on the HARQ timing.

A non-transitory computer-readable medium storing code for wireless communication is described. The code may include instructions executable to identify a timing advance parameter and a processing parameter associated with a UE, determine a HARQ timing based at least in part on the timing advance parameter or the processing parameter, or both, and transmit a HARQ response message based at least in part on the HARQ timing.

BRIEF DESCRIPTION OF THE DRAWINGS

Aspects of the disclosure are described in reference to the following figures.

DETAILED DESCRIPTION

Figure 1:
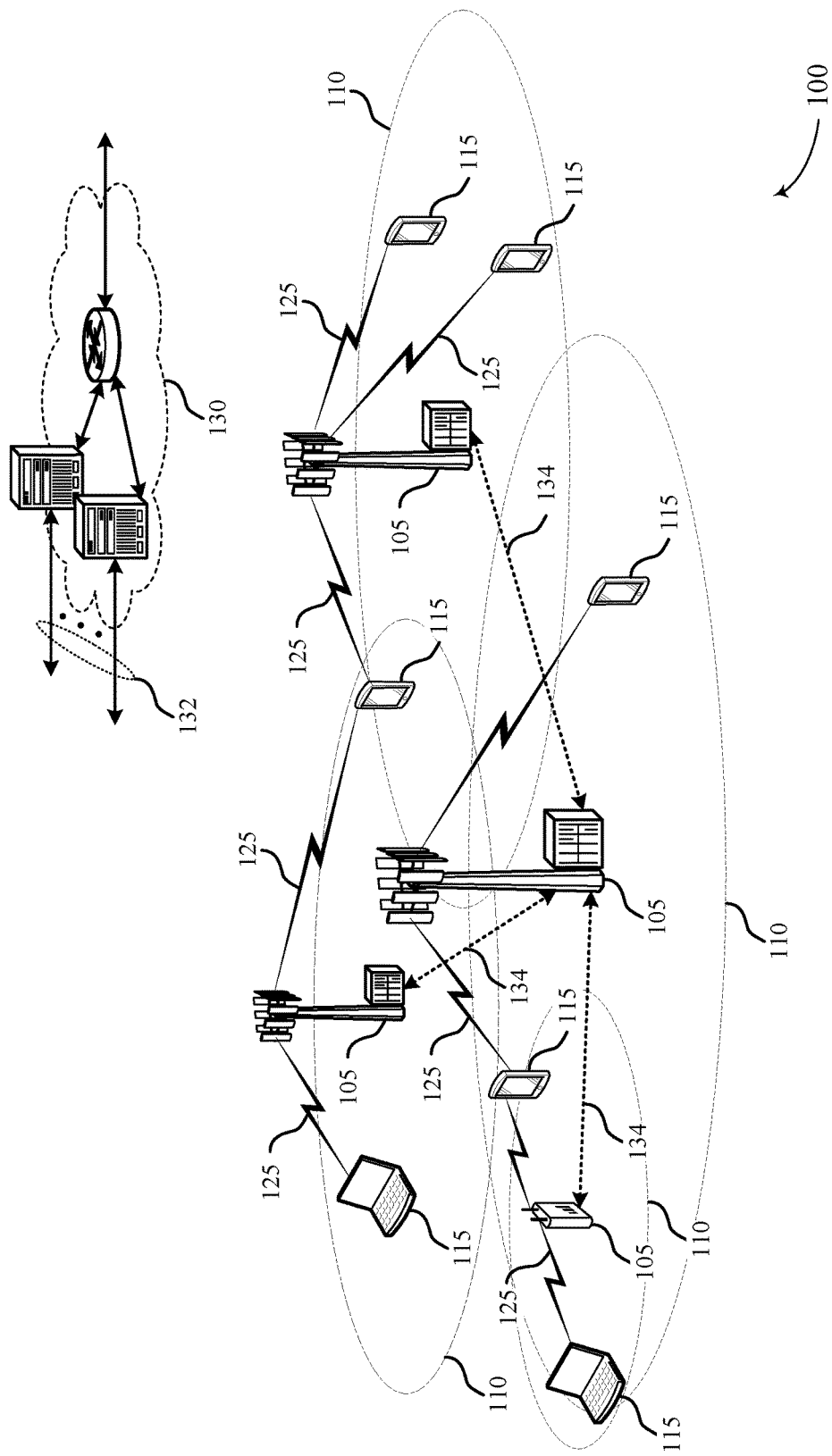
FIG. 1 illustrates an example of a wireless communications system that supports low latency operation with different hybrid automatic repeat request (HARQ) timing in accordance with various aspects of the present disclosure.

In some cases, a wireless system may utilize low latency operations. This may be achieved by utilizing a reduced transmission time interval (TTI). UEs employing low latency operations may be affected by certain transmission timing, such as HARQ timing, more than other UEs. Accordingly, HARQ timing may need to be dynamically determined and adjusted to account for changing timing advance parameters and processing parameters associated with a UE.

During low latency operations, if different user equipment (UEs) are frequency multiplexed within an uplink subframe, it may be appropriate to have a UE-specific uplink (UL) timing advance (TA) such that the reception times for different UEs are substantially aligned at the base station. That is, a UE closer to the base station may have a smaller TA based on having a smaller propagation delay.

Accordingly, in some cases a system may be designed such that all UL traffic with a given TTI arrives at the base station at approximately the same time. This may enable a base station to use a single fast Fourier transform (FFT) processing without interference when frequency multiplexing different UL traffic in the same subframe. Low latency UL TA may be handled differently when low latency traffic coexists with other traffic. That is, low latency traffic may utilize different TA commands or different TA loops. For example, a base station may target different propagation areas for low latency and other traffic. This approach may also be used if low latency and other traffic can be time division multiplexed to avoid mutual interference.

In order to handle different UL TA impact, the link between a DL transmission and the corresponding UL feedback can be UE-specific. Similarly, the link between an UL transmission and the next DL response can also be UE-specific. That is, HARQ timing may depend on the UL TA for each UE, as well as on UE processing capability and load. Accordingly, a UE can indicate its processing capability to the base station. Additionally or alternatively, a UE can indicate its UL TA (either explicitly or implicitly). That is, a UE may transmit an explicit TA indication so the base station can adjust the HARQ timing accordingly. Alternatively, a UE may send an implicit TA indication. In some cases, a base station can indicate the UL TA commands, and possibly the response time options for a UE, as part of a random access procedure message.

A fallback operation may, for example, be configured such that there is a default timing operation that a UE and a base station may use, e.g., if synchronization is lost. In some cases, the default timing operation can assume the worst case UL TA. If low latency broadcast is supported, a common timing option may also be used (that is, a worst case UL TA for all possible UEs). Reference signal dependent TTI lengths may also be supported.

Aspects of the disclosure are initially described below in the context of a wireless communication system. Specific examples are then described for various UL/DL offset timing configurations based on different propagation delays. These and other aspects of the disclosure are further illustrated by and described with reference to apparatus diagrams, system diagrams, and flowcharts that relate to low latency operation with different hybrid automatic repeat request (HARQ) timing.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network. In some cases, wireless communications system 100 may utilize low latency operations and HARQ timing may be based on the timing advance of each UE 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

After the UE 115 decodes the system information from a base station 105, it may transmit a random access channel (RACH) preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an uplink (UL) resource grant, a timing advance and a temporary cell radio network temporary identity (C-RNTI). The UE 115 may then transmit a radio resource control (RRC) connection request, or RACH message 3, along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new cell radio network temporary identity (C-RNTI). If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

Time intervals in LTE may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

In some cases, a UE 115 will apply a negative timing offset (or timing advance (TA)) to each transmission (i.e., it may send the transmission before the beginning of a TTI) to account for the propagation delay between the UE 115 and the base station 105. This may ensure that the base station 105 receives transmissions from different UEs 115 at substantially the same time. In some cases, a base station 105 may send a timing advance command (TAC) together with a RAR during a RACH procedure. The UE 115 may then set the TA based on the TAC. In some cases, the UE 115 may set the TA at a preconfigured time after receiving the TAC (e.g., during the 6th subframe following the TAC). A base station 105 may send subsequent TAC updates within media access control (MAC) control elements (CEs). In some cases, a UE 115 may set a TA timer after receiving a TAC. If the timer expires without receiving another TAC, the UE 115 may determine that it has lost synchronization (and, as a consequence, flush its HARQ buffers and release UL control resources.)

Wireless communications system 100 may improve the reliability of communication links 125 using hybrid automatic repeat request (HARQ) procedures. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125. In some cases, the time between a transmission, a HARQ response (i.e., and acknowledgement (ACK) or negative ACK (NACK)), and retransmission may depend on the TA of each specific UE 115.

In some cases, wireless communications system 100 may utilize one or more enhanced component carriers (eCCs). An enhanced component carrier (eCC) may be characterized by one or more features including: flexible bandwidth, different TTIs, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC or a low latency component carrier (CC) may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from downlink (DL) to uplink (UL) operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Thus, a UE 115 and a base station 105 may identify a timing advance parameter and a processing parameter for the UE 115 and determine a hybrid automatic repeat request (HARQ) timing to the identified parameters. For example, if the UE 115 has a large timing advance or reduced processing capacity, a longer HARQ timing may be chosen. When the UE 115 receives DL transmissions from the base station, the UE may send an ACK or NACK based on the chosen HARQ timing. The base station 105 may then send a retransmission (in the case of a NACK) based on the HARQ timing. In some cases the UE 115 may request a specific HARQ timing, or request an updated timing advance. If HARQ synchronization is lost, the UE 115 and the base station 105 may default to a preconfigured HARQ timing which may be based on a large timing advance.

Figure 2:
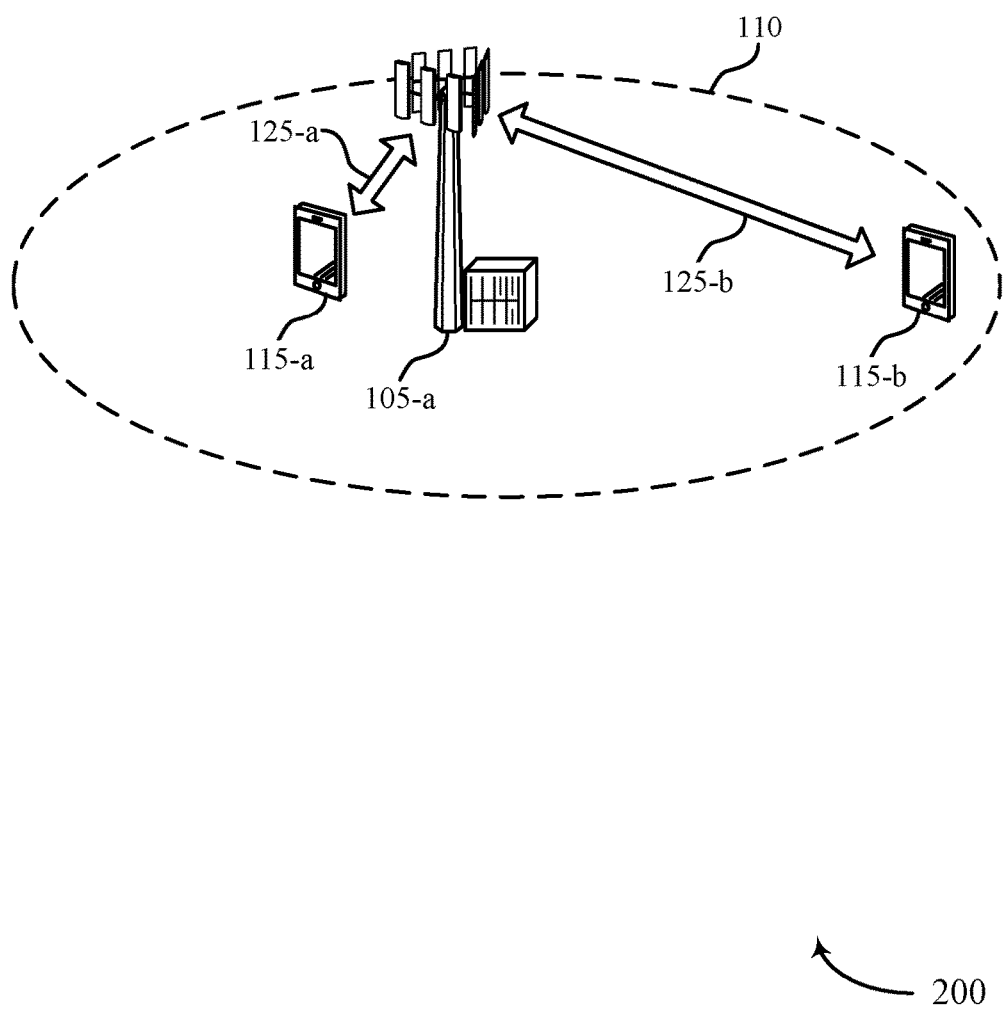
FIG. 2 illustrates an example of a wireless communications system that supports low latency operation with different HARQ timing in accordance with various aspects of the present disclosure.

FIG. 2 illustrates an example of a wireless communications system 200 for low latency operation with different HARQ timing in accordance with various aspects of the present disclosure. Wireless communications system 200 may include UE 115-a, UE 115-b, and base station 105-a, which may be examples of UEs 115 and a base station 105 described with reference to FIG. 1. Wireless communications system 200 illustrates an example in which UE 115-a is closer to base station 105-a than UE 115-b is. Accordingly, communication link 125-a may have a shorter propagation delay than communication link 125-b. Thus, base station 105-a may configure UE 115-a with a shorter HARQ response time than UE 115-b.

Wireless communications system 200 may utilize low latency operations. This may be achieved by utilizing a reduced TTI, such as a one symbol period TTI (~71 μs for a normal cyclic prefix (CP) and ~83 μs for an extended CP). This may enable wireless communications system 200 (which may be based on LTE) to achieve one-tenth of the over-the-air HARQ latency of systems that do not utilize low latency operations. That is, the HARQ latency may be approximately 300 μs rather than 4 ms. Low latency operations may reuse LTE numerology to minimize the impact on specifications and improve backward compatibility. For example, a low latency system may use 15 kHz tone spacing and a symbol duration approximately 71 μs (with a normal CP). This may enable smooth integration of low latency capable devices with devices that are not capable of low latency operation. For example wireless communications system 200 may achieve co-existence within a subframe via resource block level multiplexing. Low latency operations may be utilized for both small cells and for macro cells.

If UE 115-$a$ and UE 115-$b$ are frequency multiplexed within one or more uplink subframes, it may be appropriate to have a UE-specific UL TA such that the reception times for UE 115-$a$ and UE 115-$b$ at the base station 105-$a$ are substantially aligned. That is, UE 115-$a$, being closer to base station 105-$a$, may have a smaller TA based on having a smaller propagation delay. In the case of UE 115-$b$, the propagation delay may be large. For example, for a 10 km distance between base station 105-$a$ and a UE 115-$b$, the TA may be approximately 67 us. As a result, for a DL transmission with a 4-symbol turn-around time for a hybrid automatic repeat request (HARQ) response) the processing time available for UE 115-$b$ may be reduced from 3 symbols to roughly 2 symbol periods. For larger distances, the processing time may be even further reduced. For example, with a 30 km distance (with a TA of 200 us), the actual processing time may be close to zero (less than one symbol period).

Wireless communications system 200 may be designed such that all UL traffic within a given TTI arrives at base station 105-$a$ at approximately the same time. This may enable base station 105-$a$ to use a single fast Fourier transform (FFT) processing without interference when frequency multiplexing different UL traffic in the same subframe. In some cases, low latency UL TA may be handled differently when low latency traffic coexists with other traffic. That is, low latency traffic may utilize different TA commands or different TA loops. For example, base station 105-$a$ may target different propagation areas for low latency and other traffic. This approach may also be used if low latency and other traffic can be time division multiplexed to avoid mutual interference.

In order to handle different UL TA impact, the link between a DL transmission and the corresponding UL feedback can be UE-specific. Similarly, the link between an UL transmission and the next DL response can also be UE-specific. That is, HARQ timing may depend on the UL TA for each UE 115, as well as on UE processing capability and load. For example, with a 1 symbol TTI, UE 115-$a$ may be configured for a 4 symbol HARQ response time (that is, the ACK/NACK may be sent 4 symbols after the transmission), or if it has a relatively small amount of processing power available UE 115-$a$ may be configured with a 5 symbol response time; UE 115-$a$ may also be configured with a 5 symbol response time based on propagation delay or if it has relatively little processing power (or a very large UL TA) it may be configured with a 6 symbol response time. In some cases, the base station retransmission delay (i.e., the time between base station 105-$a$ receiving a NACK and retransmitting a block of data) may be configured such that the total delay between transmission and retransmission may be constant (e.g., 8 symbols). In other cases, the total delay may be based on the UE response time.

In cases when the HARQ timing depends on UE capabilities, UE 115-$a$ and UE 115-$b$ can indicate their processing capability to the base station. Additionally or alternatively, UE 115-$a$ and UE 115-$b$ can indicate their respective UL TAs (either explicitly or implicitly). That is, a UE 115-$a$ and UE 115-$b$ may transmit explicit TA indications so base station 105 can adjust the HARQ timing accordingly. For example, if UE 115-$a$ is moving rapidly within a geographic coverage area 110, it may anticipate a changing timing advance before a base station sends another timing advance command. Alternatively, UE 115-$a$ and UE 115-$b$ may send implicit TA indications. For example, UE 115-$a$ and UE 115-$b$ may simply send a request for a desired response timing. In some cases, base station 105-$a$ may provide a 115-$a$ or UE 115-$b$ with one or more upper and lower bounds on the TA associated with different discrete response timing levels. In some cases, a hysteresis value can be provided to avoid ping-pong effect. For example, if UE 115-$b$ currently has TA of 40 us, it can indicate a desired response time of only if the propagation delay drops to 5 us (the hysteresis value) below a threshold of 30 us (that is, if it drops to 25 us). If the TA goes back up, UE 115-$b$ may wait until the propagation delay gets 5 us above a threshold of 30 us (that is, if it increases to 35 us) prior to adjusting the TA and/or HARQ timing (or requesting an adjustment).

In some cases, base station 105-$a$ can indicate the UL TA commands, and possibly the response time options for UE 115-$a$ and UE 115-$b$ as part of a random access procedure message. For example, if the TA is large, the base station may indicate a 5 symbol response time; otherwise, a 4 symbol response time may be indicated. Base station 105-$a$ may then send an updated response time to the UE 115-$a$ or UE 115-$b$ later on based on other factors (e.g., past TA commands, scheduling needs, processing capabilities, etc.)

In some cases a fallback operation may be configured such that there is always a default timing operation such that UE 115-$a$ and base station 105-$a$ may use, e.g., if synchronization is lost. In some cases, the default timing operation can assume the worst case UL TA. If low latency broadcast is supported, a common timing option may also be used (that is, a worst case UL TA for all possible UEs 115). It should be noted that the above discussion may be applicable to various TTI lengths (e.g., 1 symbol, 2 symbol, 1 slot, etc.). Reference signal dependent TTI lengths may also be supported. For example, for cell-specific reference signal (CRS) based low latency operation, a 1-symbol TTI length may be used; for demodulation reference signal (DM-RS) based ULL, a 2 symbol TTI length may be used (since in some cases it may be easier to design a DM-RS pattern with a 2-symbol TTI). The above discussion may also applicable to cases when the processing capability at the UE side is limited. For example, with a large number of component carriers (CCs) or CCs with large bandwidth (e.g., greater than 20 MHz), different UEs 115 may utilize different response time options.

Figure 3A:
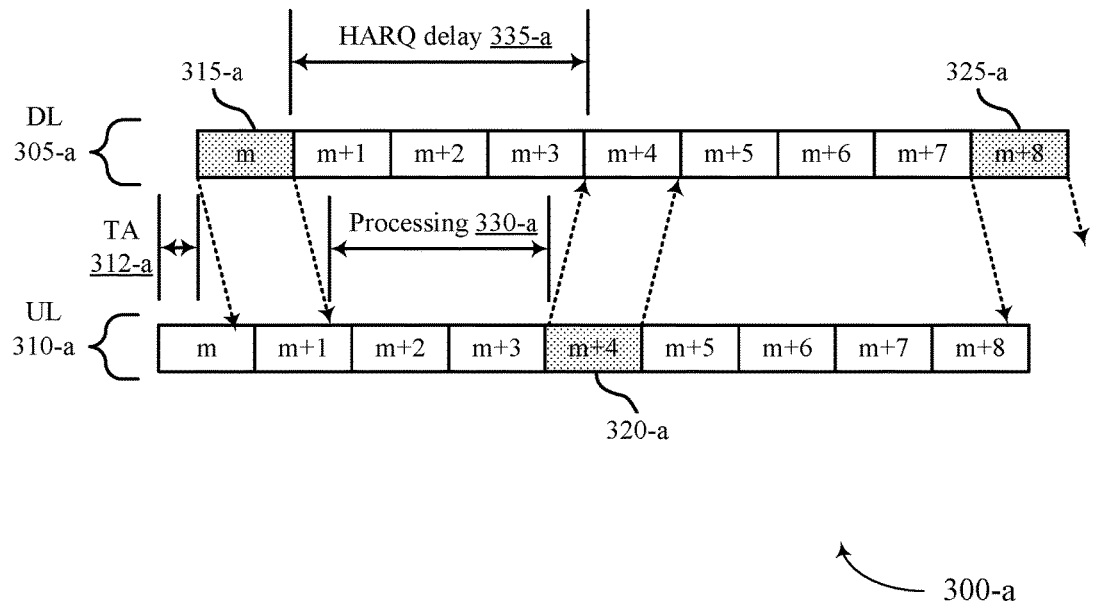
FIGS. 3A and 3B illustrate examples of offset timing configurations that supports low latency operation with different HARQ timing in accordance with various aspects of the present disclosure.

FIG. 3A illustrates an example of an offset timing configuration 300-$a$ for low latency operation with different HARQ timing in accordance with various aspects of the present disclosure. Offset timing configuration 300-$a$ may represent a DL timing 305-$a$ for a base station 105 and an UL timing 310-$a$ for a UE 115, which may be examples of a UE 115 and base station 105 described with reference to FIGS. 1-2. Offset timing configuration 300-$a$ may represent an example of low latency HARQ operation with a relatively small timing advance (TA) 315-$a$.

UL timing 310-$a$ may be offset from DL timing 305-$a$ by TA 312-$a$ to account for a propagation delay between the corresponding UE 115 and base station 105. This may enable UL transmissions from different UEs 115 to arrive substantially simultaneously at a base station 105. According to the example of offset timing configuration 300-*a*, a transmission 315-*a* may be transmitted during DL subframe m. Based on the offset timing and the propagation delay, the transmission is received largely during symbol m+1 of the UE 115. The receiving UE 115 may then process the transmission during processing period 330-*a* and respond with a HARQ response 320-*a* (either ACK or NACK). HARQ response 320-*a* may be transmitted such that there is a HARQ delay 335-*a* of 4 symbols. The base station 105 may then send retransmission 4 symbols later (at m+8).

Figure 3B:
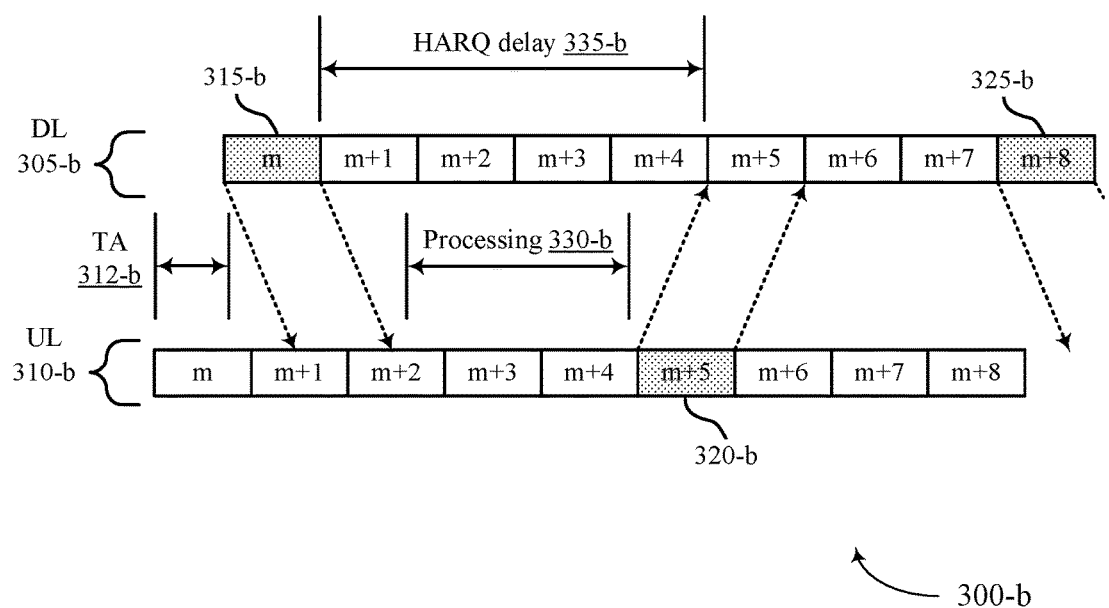

FIG. 3B illustrates an example of an offset timing configuration 300-*b* for low latency operation with different HARQ timing in accordance with various aspects of the present disclosure. Offset timing configuration 300-*b* may represent a DL timing 305-*b* for a base station 105 and an UL timing 310-*b* for a UE 115, which may be examples of a UE 115 and base station 105 described with reference to FIGS. 1-2. Offset timing configuration 300-*b* may represent an example of low latency HARQ operation with a relatively large timing advance (TA) 312-*b*.

UL timing 310-*b* may be offset from DL timing 305-*b* by TA 312-*b* to account for a propagation delay between the corresponding UE 115 and base station 105. This may enable UL transmissions from different UEs 115 to arrive substantially simultaneously at a base station 105. According to the example of offset timing configuration 300-*b*, a transmission 315-*b* may be transmitted during DL subframe m and based on the offset timing and the propagation delay, the transmission is received largely during symbol m+1 and m+2 of the UE 115. The receiving UE 115 may then process the transmission during processing period 330-*b* and respond with a HARQ response 320-*b* (either ACK or NACK). HARQ response 320-*b* may be transmitted such that there is a HARQ delay 335-*b* of 5 symbols. That is, HARQ delay 335-*b* may be lengthened to account for the large TA 312-*b* while still providing a sufficient processing period 330-*b*. In some cases, the HARQ delay 225-*b* may be configured based on both the TA 312-*b* and the desired processing period 330-*b* (e.g., based on the UE processing capability and load).

The base station 105 may then send retransmission 4 symbols later (at m+8). That is, in some cases, the total HARQ period between transmission and retransmission may not depend on the HARQ delay 335-*b*. In other cases, the total HARQ period may be adjusted. Offset timing configuration 300-*a* and offset timing configuration 300-*b* represent two examples of how HARQ timing may depend on propagation delay or processing time, but other examples may also be possible (e.g., using different TTI lengths other than 1 symbol period).

Figure 4:
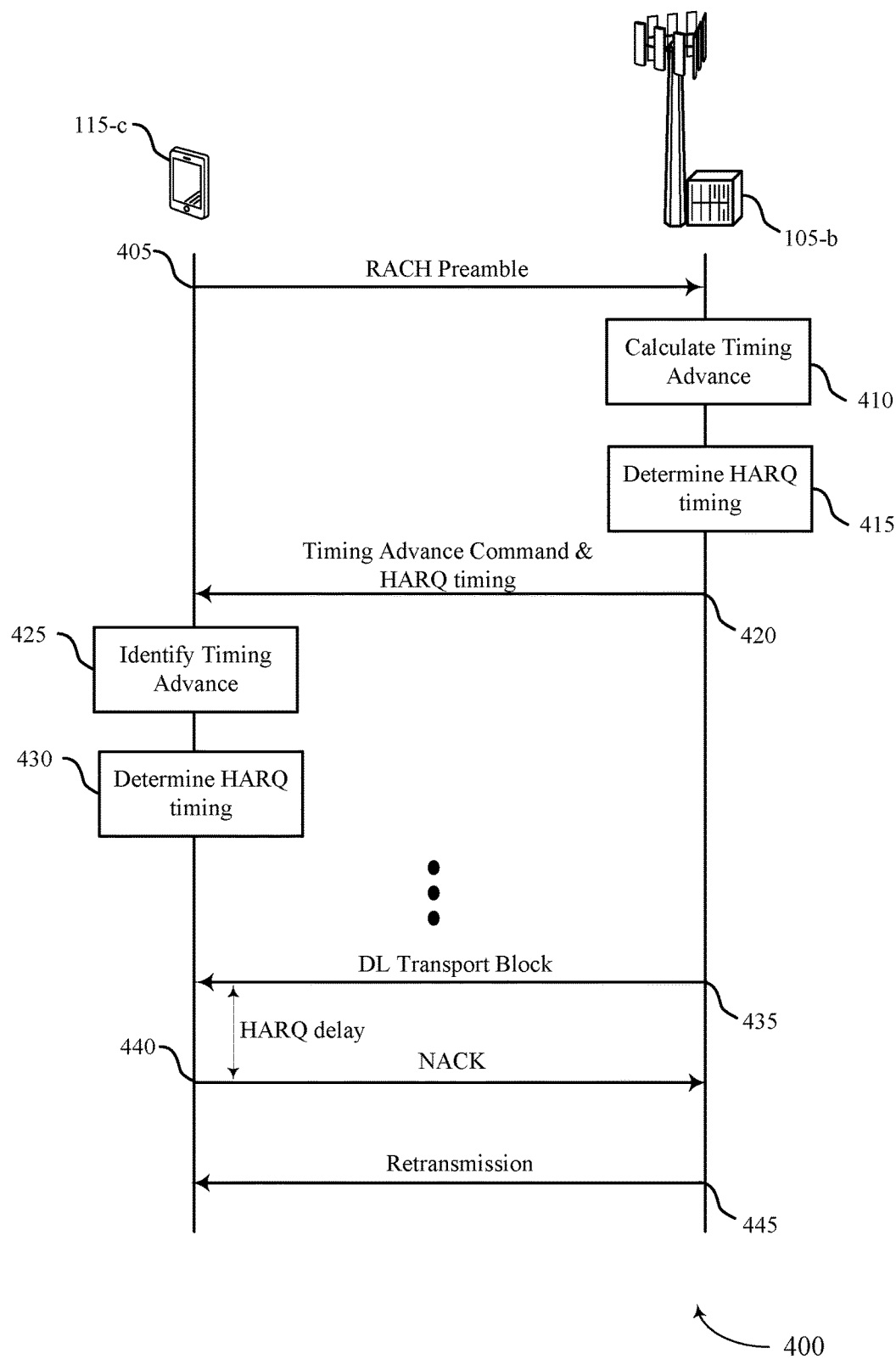
FIG. 4 illustrates an example of a process flow that supports low latency operation with different HARQ timing in accordance with various aspects of the present disclosure.

FIG. 4 illustrates an example of a process flow 400 for low latency operation with different HARQ timing in accordance with various aspects of the present disclosure. Process flow 400 may include a UE 115-*c* and base station 105-*b*, which may be examples of a UE 115 and base station 105 described with reference to FIGS. 1-2. Process flow 400 represents one example of how HARQ timing may be configured based on a timing advance or processing time, but other examples are also possible.

At 405, UE 115-*c* may transmit a RACH preamble to base station 105-*b*. At 410, base station 105-*b* may calculate a timing advance based on the RACH preamble. At 415, base station 105-*b* may also determine a HARQ timing. Thus, base station 105-*b* may receive a RACH message from UE 115-*c*, such that the timing advance parameter may be identified based on the RACH message.

In some examples, the timing advance parameter is identified based on past timing advance commands or scheduling needs, or both. The HARQ timing may be based on low latency operation. In some examples, the low latency operation is based on a TTI duration. The TTI duration may be determined based on a reference signal type within the TTI. In some examples, the HARQ timing is based on a number of configured CCs, a number of scheduled CCs, a bandwidth of configured CCs, a bandwidth of scheduled CCs, or any combination thereof.

At 420, base station 105-*b* may transmit a random access response including a timing advance command and, in some cases, the HARQ timing. In other cases, the HARQ timing may be configured with another message such as an RRC configuration message. Thus, base station 105-*b* may transmit signaling indicative of the HARQ timing to UE 115-*c*. In some examples, the signaling may include a random access grant, the timing advance parameter, the HARQ timing, or any combination thereof. Similarly, UE 115-*c* may receive signaling indicative of the HARQ timing from base station 105-*b*, such that the HARQ timing is determined based on the signaling. In some examples, the signaling includes the timing advance parameter.

At 425, UE 115-*c* may identify the TA. At 430, UE 115-*c* may identify the HARQ timing. UE 115-*c* and base station 105-*b* may identify a timing advance parameter and a processing parameter associated with UE 115-*c*. UE 115-*c* and base station 105-*b* may determine a HARQ timing based on the timing advance parameter or the processing parameter, or both. In some examples, the processing parameter is associated with a processing capability of the UE or a processing load of the UE, or both.

In some cases (not shown) UE 115-*c* may transmit a HARQ timing preference to base station 105-*b*, such that the HARQ timing is determined based on the HARQ timing preference. Similarly, base station 105-*b* may receive a HARQ timing preference from UE 115-*c*. In some examples, the HARQ timing preference is received in a RACH message from UE 115-*c*. In some cases, the HARQ timing preference is transmitted in a random access message. In some cases (not shown) UE 115-*c* may transmit a timing advance update message to base station 105-*b*, such that the HARQ timing is determined based on the timing advance update message.

In some cases, UE 115-*c* and base station 105-*b* may identify a set of timing advance threshold values, such that the HARQ timing is determined based on the set of timing advance threshold values. In some examples, the set of timing advance threshold values may include a hysteresis value, such that the timing advance parameter may be limited to a set duration offset based on the hysteresis value.

In some cases, UE 115-*c* and base station 105-*b* may determine a HARQ synchronization error. UE 115-*c* and base station 105-*b* may select a default HARQ timing based on the HARQ synchronization error determination. In some examples, the default HARQ timing is based on a greatest timing advance of a serving cell.

At 435, base station 105-*b* may transmit a block of data to UE 115-*c*. At 440, UE 115-*c* may respond with an ACK or, as illustrated, a NACK using a delay based on the HARQ timing. Thus, base station 105-*b* may receive an ACK or a NACK from UE 115-*c* according to the HARQ timing, such that the HARQ response message is a retransmission of the data packet based on the received ACK or NACK.

At 445, if the response is a NACK, base station 105-*b* may retransmit the data block. Thus, both UE 115-*c* and base station 105-*b* may transmit a HARQ response message (i.e., either an ACK/NACK or a retransmission) based on the HARQ timing.

Figure 5:
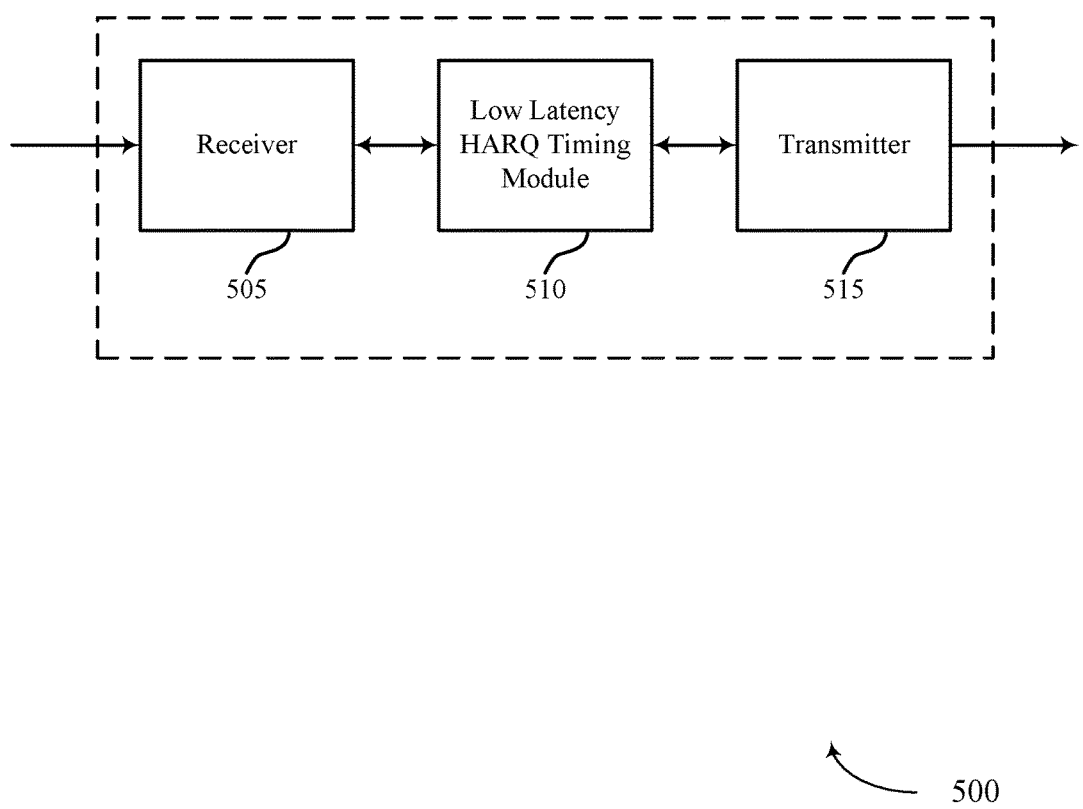
FIGS. 5-7 show block diagrams of a wireless device or devices that support low latency operation with different HARQ timing in accordance with various aspects of the present disclosure.

FIG. 5 shows a block diagram of a wireless device 500 configured for low latency operation with different HARQ timing in accordance with various aspects of the present disclosure. Wireless device 500 may be an example of aspects of a UE 115 or base station 105 described with reference to FIGS. 1-4. Wireless device 500 may include a receiver 505, a low latency HARQ timing module 510, or a transmitter 515. Wireless device 500 may also include a processor. Each of these components may be in communication with each other.

The receiver 505 may receive information such as packets, user data, or control information associated with various information channels (e.g., control channels, data channels, and information related to low latency operation with different HARQ timing, etc.). Information may be passed on to the low latency HARQ timing module 510, and to other components of wireless device 500. In some cases, (e.g., for a UE 115), the receiver 505 may receive signaling indicative of the HARQ timing from a serving cell, such that the HARQ timing is determined based on the signaling. In some examples, the signaling includes the timing advance parameter.

The low latency HARQ timing module 510 may identify a timing advance parameter and a processing parameter associated with a UE, determine a HARQ timing based on the timing advance parameter or the processing parameter, or both, and transmit a HARQ response message based on the HARQ timing.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas. In some cases, (e.g., for a base station 105), the transmitter 515 may transmit signaling indicative of the HARQ timing to a UE 115. In some examples, the signaling may include a random access grant, the timing advance parameter, the HARQ timing, or any combination thereof. In some examples, the transmitter 515 may transmit a data packet to a UE 115.

Figure 6:
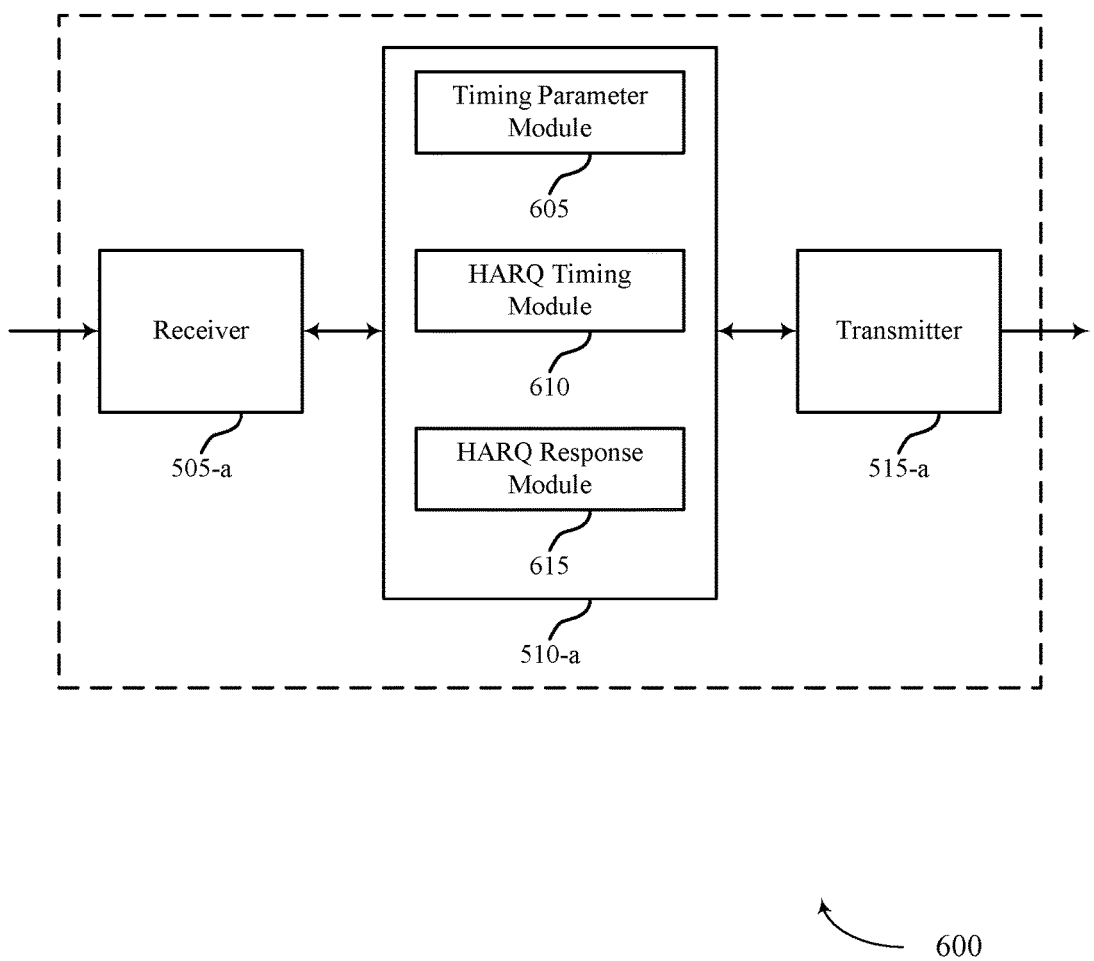

FIG. 6 shows a block diagram of a wireless device 600 for low latency operation with different HARQ timing in accordance with various aspects of the present disclosure. Wireless device 600 may be an example of aspects of a wireless device 500, a base station 105, or a UE 115 described with reference to FIGS. 1-5. Wireless device 600 may include a receiver 505-*a*, a low latency HARQ timing module 510-*a*, or a transmitter 515-*a*. Wireless device 600 may also include a processor. Each of these components may be in communication with each other. The low latency HARQ timing module 510-*a* may also include a timing parameter module 605, a HARQ timing module 610, and a HARQ response module 615.

The receiver 505-*a* may receive information which may be passed on to low latency HARQ timing module 510-*a*, and to other components of wireless device 600. The low latency HARQ timing module 510-*a* may perform the operations described with reference to FIG. 5. The transmitter 515-*a* may transmit signals received from other components of wireless device 600.

The timing parameter module 605 may identify a timing advance parameter and a processing parameter associated with a UE as described with reference to FIGS. 2-4. In some examples, the processing parameter may be associated with a processing capability of a UE 115 or a processing load of a UE 115, or both. The timing parameter module 605 may also identify a set of timing advance threshold values, such that the HARQ timing is determined based on the set of timing advance threshold values. In some examples, the set of timing advance threshold values includes a hysteresis value, such that the timing advance parameter may be limited to a set duration offset based on the hysteresis value. In some examples, the timing advance parameter may be identified based on past timing advance commands or scheduling needs, or both.

The HARQ timing module 610 may determine a HARQ timing based on the timing advance parameter or the processing parameter, or both as described with reference to FIGS. 2-4. The HARQ timing module 610 may also select a default HARQ timing based on the HARQ synchronization error determination. In some examples, the default HARQ timing may be based on a greatest timing advance of a serving cell. In some examples, the HARQ timing may be based on a number of configured CCs, a number of scheduled CCs, a bandwidth of configured CCs, a bandwidth of scheduled CCs, or any combination thereof.

The HARQ response module 615 may transmit a HARQ response message based on the HARQ timing as described with reference to FIGS. 2-4. The HARQ response module 615 may also receive an ACK or a NACK from a UE 115 according to the HARQ timing, such that the HARQ response message is a retransmission of the data packet based on the received ACK or NACK.

Figure 7:
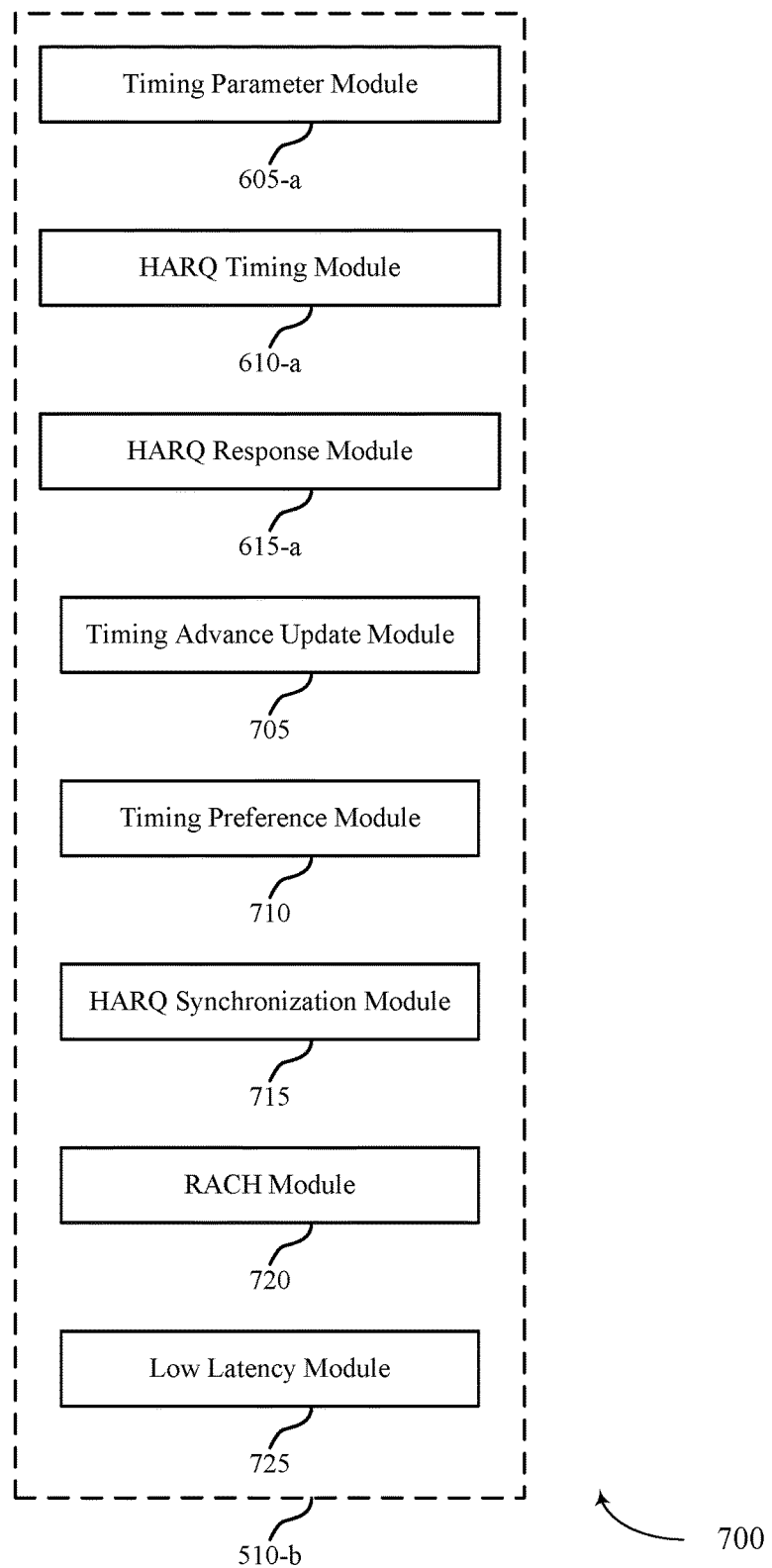

FIG. 7 shows a block diagram 700 of a low latency HARQ timing module 510-*b* which may be a component of a wireless device 500 or a wireless device 600 for low latency operation with different HARQ timing in accordance with various aspects of the present disclosure. The low latency HARQ timing module 510-*b* may be an example of aspects of a low latency HARQ timing module 510 described with reference to FIGS. 5-6. The low latency HARQ timing module 510-*b* may include a timing parameter module 605-*a*, a HARQ timing module 610-*a*, and a HARQ response module 615-*a*. Each of these modules may perform the functions described with reference to FIG. 6. The low latency HARQ timing module 510-*b* may also include a timing advance update module 705, a timing preference module 710, a HARQ synchronization module 715, a RACH module 720, and a low latency module 725.

The timing advance update module 705 may transmit a timing advance update message to a serving cell, such that the HARQ timing is determined based on the timing advance update message as described with reference to FIGS. 2-4.

The timing preference module 710 may transmit a HARQ timing preference to a serving cell, such that the HARQ timing is determined based on the HARQ timing preference as described with reference to FIGS. 2-4. In some examples, the HARQ timing preference may be transmitted in a random access message. The timing preference module 710 may also receive a HARQ timing preference from a UE 115, such that the HARQ timing is determined based on the HARQ timing preference. In some examples, the HARQ timing preference may be received in a RACH message from a UE 115.

The HARQ synchronization module 715 may determine a HARQ synchronization error as described with reference to FIGS. 2-4.

The RACH module 720 may receive a RACH message from a UE 115, such that the timing advance parameter is identified based on the RACH message as described with reference to FIGS. 2-4.

The low latency module 725 may be configured such that the HARQ timing may be based on low latency operation as described with reference to FIGS. 2-4. In some examples, the low latency operation may be based on a TTI duration. In some examples, the TTI duration may be determined based on a reference signal type within the TTI.

The components of wireless device 500, wireless device 600, and low latency HARQ timing module 510 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
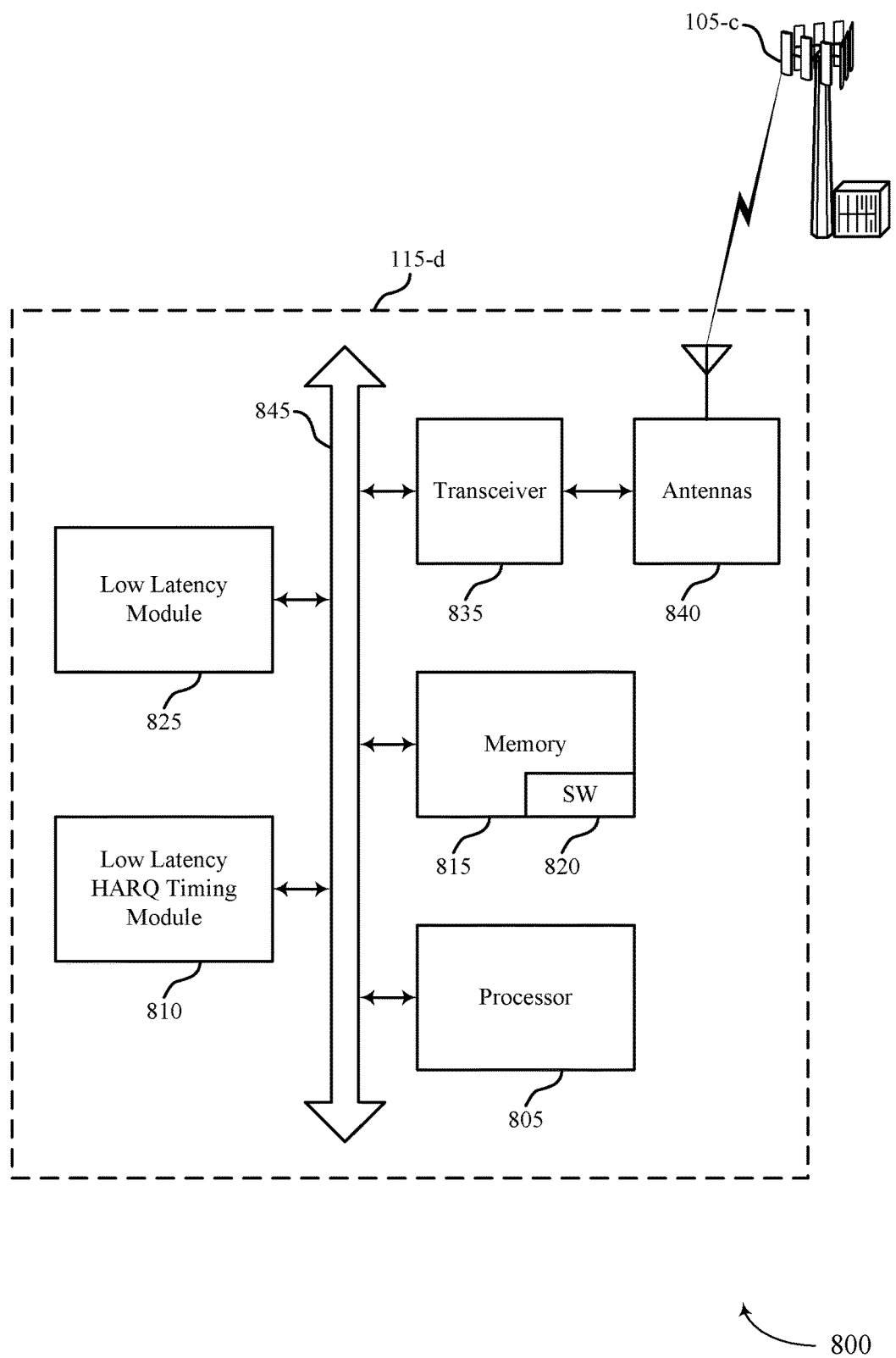
FIG. 8 illustrates a block diagram of a system including, a UE, that supports low latency operation with different HARQ timing in accordance with various aspects of the present disclosure.

FIG. 8 shows a diagram of a system 800 including a UE 115 configured for low latency operation with different HARQ timing in accordance with various aspects of the present disclosure. System 800 may include UE 115-d, which may be an example of a wireless device 500, a wireless device 600, or a UE 115 described with reference to FIGS. 1, 2 and 5-7. UE 115-d may include a low latency HARQ timing module 810, which may be an example of a low latency HARQ timing module 510 described with reference to FIGS. 5-7. UE 115-d may also include a low latency module 825. UE 115-d may also include components for bi-directional voice and data communications including components for transmitting communications and components for receiving communications. For example, UE 115-d may communicate bi-directionally with base station 105-e.

Low latency module 825 may enable UE 115-d to communicate using a reduced HARQ latency, such as using a reduced TTI as described herein.

UE 115-d may also include a processor 805, and memory 815 (including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-d may include a single antenna 840, UE 115-d may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., low latency operation with different HARQ timing, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
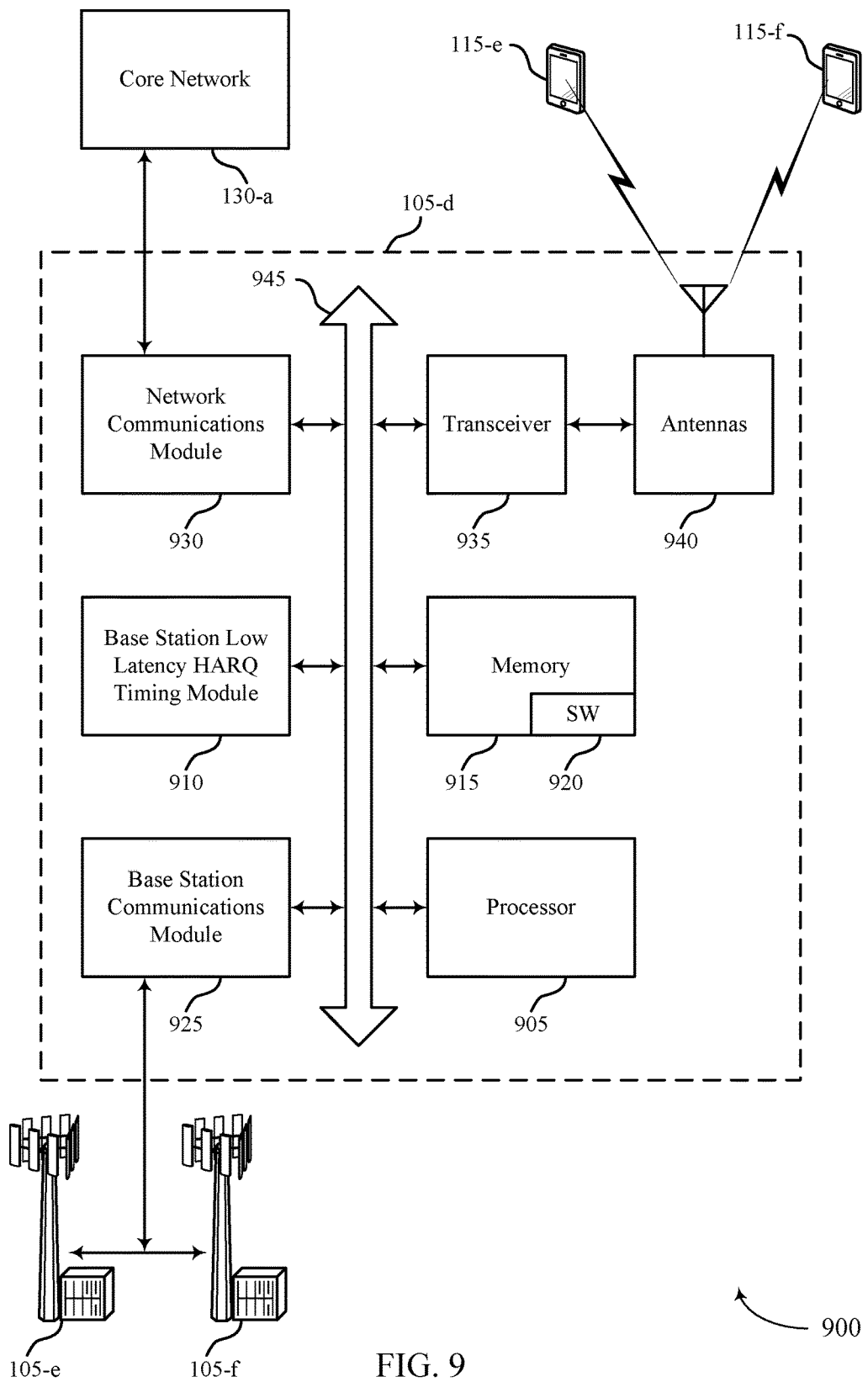
FIG. 9 illustrates a block diagram of a system including a base station that supports low latency operation with different HARQ timing in accordance with various aspects of the present disclosure.

FIG. 9 shows a diagram of a system 900 including a base station 105 configured for low latency operation with different HARQ timing in accordance with various aspects of the present disclosure. System 900 may include base station 105-d, which may be an example of a wireless device 500, a wireless device 600, or a base station 105 described with reference to FIGS. 1, 2 and 6-8. Base station 105-d may include a base station low latency HARQ timing module 910, which may be an example of a base station low latency HARQ timing module 910 described with reference to FIGS. 6-8. Base Station 105-d may also include components for bi-directional voice and data communications including components for transmitting communications and components for receiving communications. For example, base station 105-d may communicate bi-directionally with UE 115-e or UE 115-f.

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communications module 925. In some examples, base station communications module 925 may provide an X2 interface within an LTE/LTE-A wireless communication network technology to provide communication between some of the base stations 105. In some examples, base station 105-d may communicate with other base stations through core network 130. In some cases, base station 105-d may communicate with the core network 130 through network communications module 930.

The base station 105-d may include a processor 905, memory 915 (including software (SW) 920), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-d) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-d may include multiple transceivers 935, each with one or more associated antennas 940. The transceiver may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor 905 to perform various functions described herein (e.g., low latency operation with different HARQ timing, selecting coverage enhancement techniques, call processing, database management, message routing, etc.). Alternatively, the software code 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communications module 925 may manage communications with other base stations 105. In some cases, a communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

Figure 10:
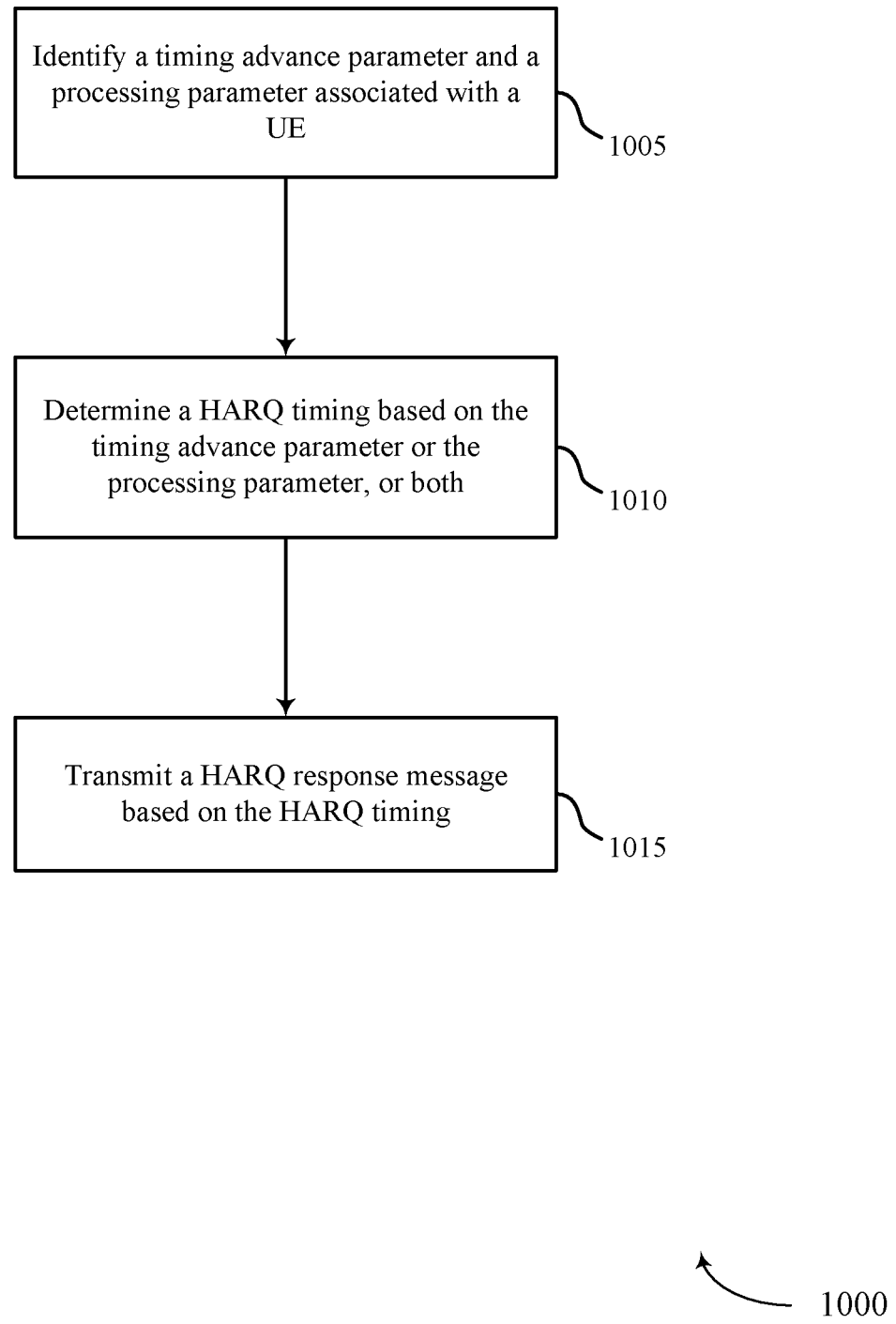
FIGS. 10-17 illustrate methods for low latency operation with different HARQ timing in accordance with various aspects of the present disclosure.

FIG. 10 shows a flowchart illustrating a method 1000 for low latency operation with different HARQ timing in accordance with various aspects of the present disclosure. The operations of method 1000 may be implemented by a device such as a UE 115, a base station 105, or their components as described with reference to FIGS. 1-9. For example, the operations of method 1000 may be performed by the low latency HARQ timing module 510 as described with reference to FIGS. 5-8. In some examples, a device may execute a set of codes to control the functional elements of the device to perform the functions described below. Additionally or alternatively, the device may perform aspects the functions described below using special-purpose hardware.

At block 1005, the device may identify a timing advance parameter and a processing parameter associated with a UE as described with reference to FIGS. 2-4. In certain examples, the operations of block 1005 may be performed by the timing parameter module 605 as described with reference to FIG. 6.

At block 1010, the device may determine a HARQ timing based at least in part on the timing advance parameter or the processing parameter, or both as described with reference to FIGS. 2-4. In certain examples, the operations of block 1010 may be performed by the HARQ timing module 610 as described with reference to FIG. 6.

At block 1015, the device may transmit a HARQ response message based at least in part on the HARQ timing as described with reference to FIGS. 2-4. In certain examples, the operations of block 1015 may be performed by the HARQ response module 615 as described with reference to FIG. 6.

Figure 11:
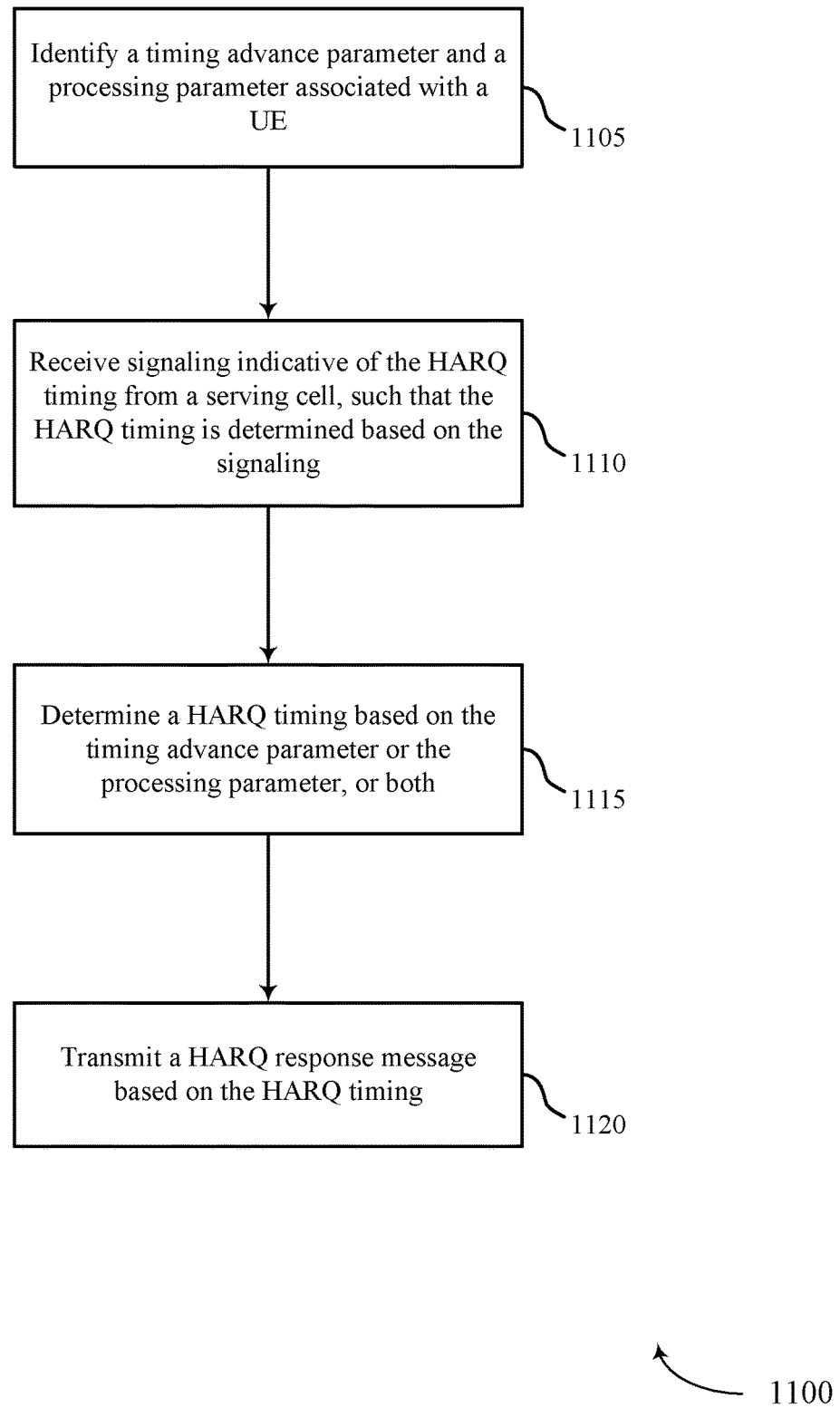

FIG. 11 shows a flowchart illustrating a method 1100 for low latency operation with different HARQ timing in accordance with various aspects of the present disclosure. The operations of method 1100 may be implemented by device such as a UE 115, or its components as described with reference to FIGS. 1-9. For example, the operations of method 1100 may be performed by the low latency HARQ timing module 510 as described with reference to FIGS. 5-8. In some examples, a UE 115 may execute a set of codes to control the functional elements of the device to perform the functions described below. Additionally or alternatively, the UE 115 may perform aspects the functions described below using special-purpose hardware. The method 1100 may also incorporate aspects of method 1000 of FIG. 10.

At block 1105, the UE 115 may identify a timing advance parameter and a processing parameter associated with a UE as described with reference to FIGS. 2-4. In certain examples, the operations of block 1105 may be performed by the timing parameter module 605 as described with reference to FIG. 6.

At block 1110, the UE 115 may receive signaling indicative of the HARQ timing from a serving cell, such that a HARQ timing is determined based at least in part on the signaling as described with reference to FIGS. 2-4. In certain examples, the operations of block 1110 may be performed by the receiver 505 as described with reference to FIG. 5.

At block 1115, the UE 115 may determine a HARQ timing based at least in part on the timing advance parameter or the processing parameter, or both as described with reference to FIGS. 2-4. In certain examples, the operations of block 1115 may be performed by the HARQ timing module 610 as described with reference to FIG. 6.

At block 1120, the UE 115 may transmit a HARQ response message based at least in part on the HARQ timing as described with reference to FIGS. 2-4. In certain examples, the operations of block 1120 may be performed by the HARQ response module 615 as described with reference to FIG. 6.

Figure 12:
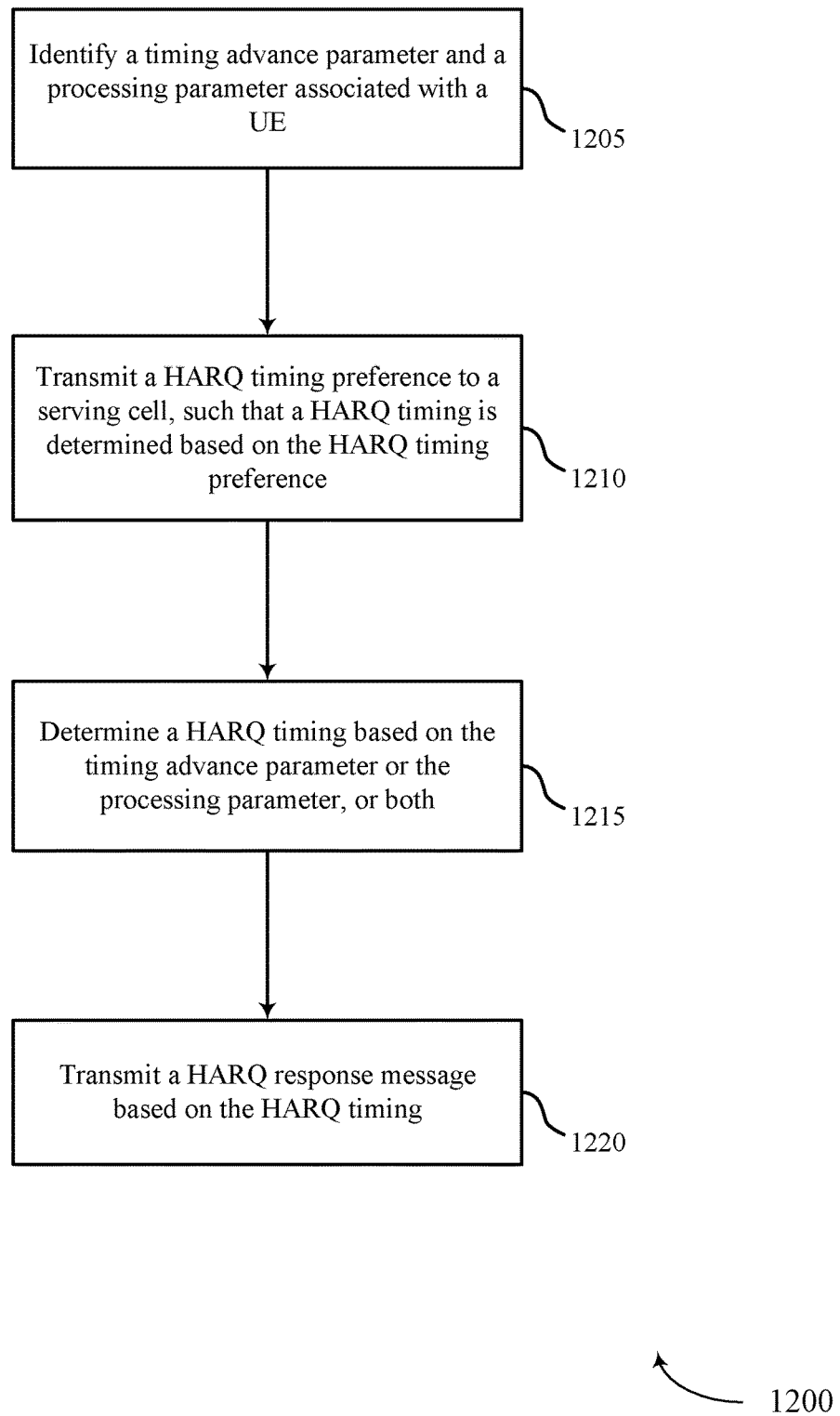

FIG. 12 shows a flowchart illustrating a method 1200 for low latency operation with different HARQ timing in accordance with various aspects of the present disclosure. The operations of method 1200 may be implemented by a UE 115 or its components as described with reference to FIGS. 1-9. For example, the operations of method 1200 may be performed by the low latency HARQ timing module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of methods 1000, and 1100 of FIGS. 10-11.

At block 1205, the UE 115 may identify a timing advance parameter and a processing parameter associated with a UE as described with reference to FIGS. 2-4. In certain examples, the operations of block 1205 may be performed by the timing parameter module 605 as described with reference to FIG. 6.

At block 1210, the UE 115 may transmit a HARQ timing preference to a serving cell, such that a HARQ timing is determined based at least in part on the HARQ timing preference as described with reference to FIGS. 2-4. In certain examples, the operations of block 1210 may be performed by the timing preference module 710 as described with reference to FIG. 7.

At block 1215, the UE 115 may determine a HARQ timing based at least in part on the timing advance parameter or the processing parameter, or both as described with reference to FIGS. 2-4. In certain examples, the operations of block 1215 may be performed by the HARQ timing module 610 as described with reference to FIG. 6.

At block 1220, the UE 115 may transmit a HARQ response message based at least in part on the HARQ timing as described with reference to FIGS. 2-4. In certain examples, the operations of block 1220 may be performed by the HARQ response module 615 as described with reference to FIG. 6.

Figure 13:
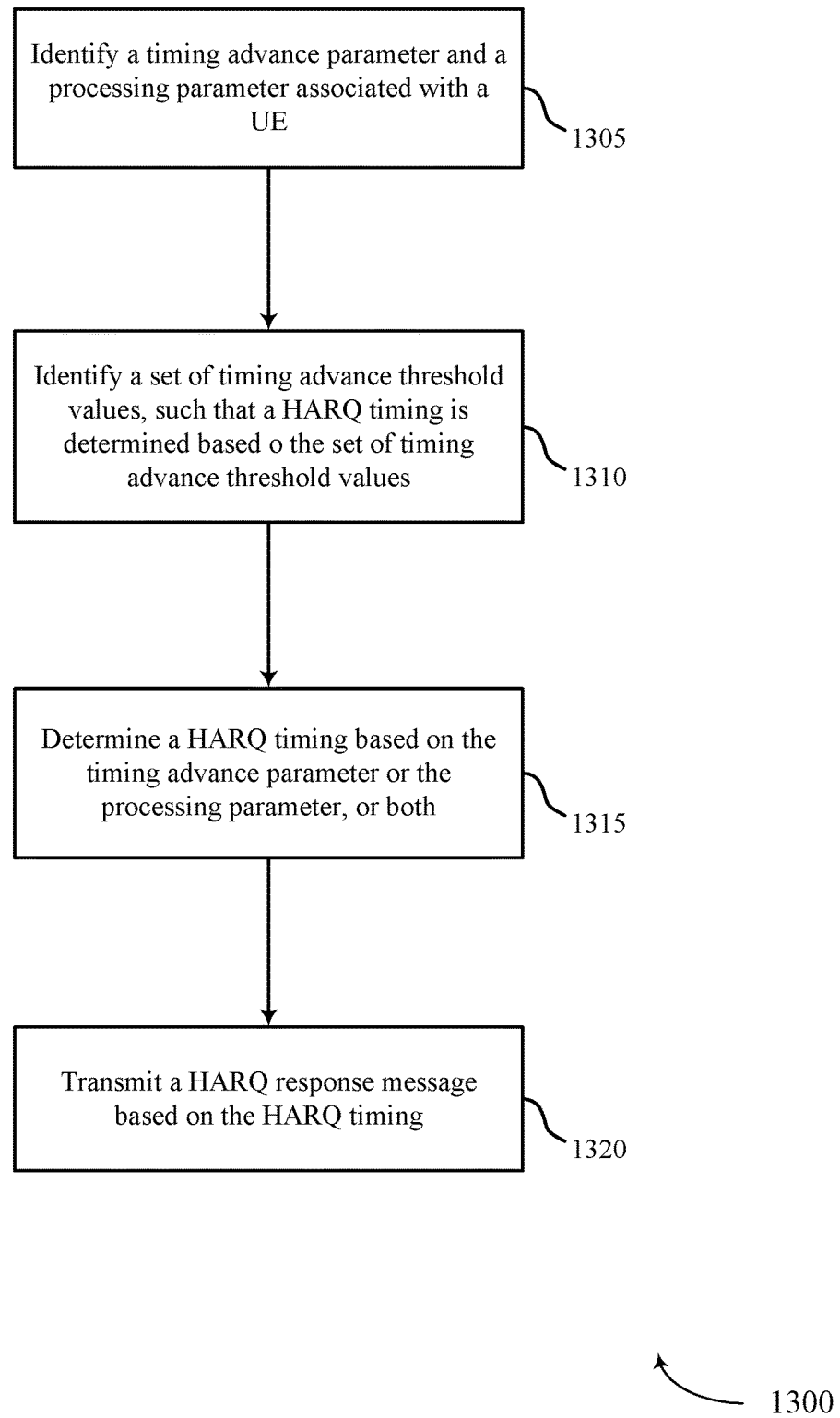

FIG. 13 shows a flowchart illustrating a method 1300 for low latency operation with different HARQ timing in accordance with various aspects of the present disclosure. The operations of method 1300 may be implemented by device such as a UE 115, a base station 105, or their components as described with reference to FIGS. 1-9. For example, the operations of method 1300 may be performed by the low latency HARQ timing module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1300 may also incorporate aspects of methods 1000, 1100, and 1200 of FIGS. 10-12.

At block 1305, the device may identify a timing advance parameter and a processing parameter associated with a UE as described with reference to FIGS. 2-4. In certain examples, the operations of block 1305 may be performed by the timing parameter module 605 as described with reference to FIG. 6.

At block 1310, the device may identify a set of timing advance threshold values, such that a HARQ timing is determined based at least in part on the set of timing advance threshold values as described with reference to FIGS. 2-4. In certain examples, the operations of block 1310 may be performed by the timing parameter module 605 as described with reference to FIG. 6.

At block 1315, the device may determine a HARQ timing based at least in part on the timing advance parameter or the processing parameter, or both as described with reference to FIGS. 2-4. In certain examples, the operations of block 1315 may be performed by the HARQ timing module 610 as described with reference to FIG. 6.

At block 1320, the device may transmit a HARQ response message based at least in part on the HARQ timing as described with reference to FIGS. 2-4. In certain examples, the operations of block 1320 may be performed by the HARQ response module 615 as described with reference to FIG. 6.

Figure 14:
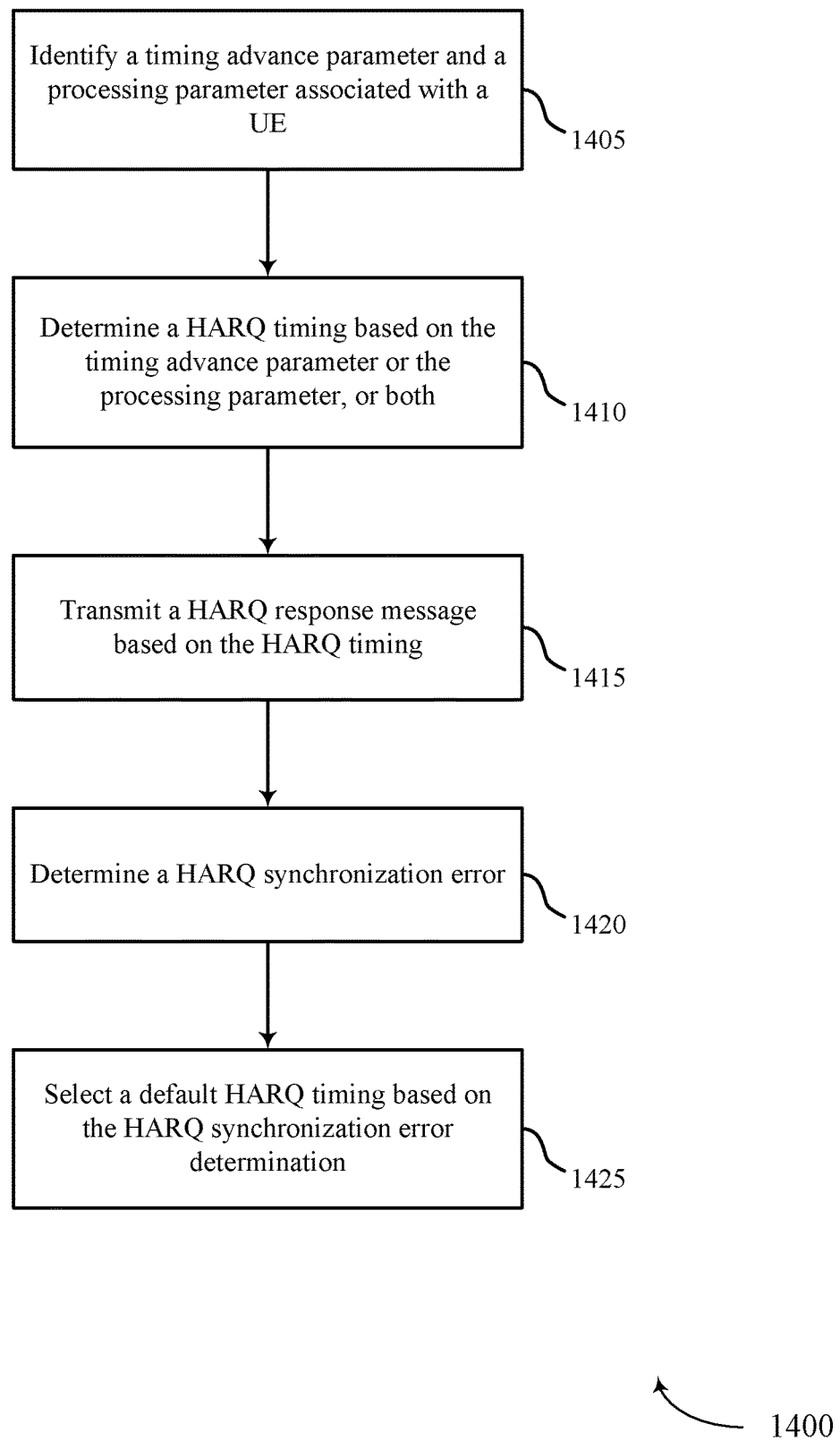

FIG. 14 shows a flowchart illustrating a method 1400 for low latency operation with different HARQ timing in accordance with various aspects of the present disclosure. The operations of method 1400 may be implemented by device such as a UE 115, a base station 105, or their components as described with reference to FIGS. 1-9. For example, the operations of method 1400 may be performed by the low latency HARQ timing module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1400 may also incorporate aspects of methods 1000, 1100, 1200, and 1300 of FIGS. 10-13.

At block 1405, the device may identify a timing advance parameter and a processing parameter associated with a UE as described with reference to FIGS. 2-4. In certain examples, the operations of block 1405 may be performed by the timing parameter module 605 as described with reference to FIG. 6.

At block 1410, the device may determine a HARQ timing based at least in part on the timing advance parameter or the processing parameter, or both as described with reference to FIGS. 2-4. In certain examples, the operations of block 1410 may be performed by the HARQ timing module 610 as described with reference to FIG. 6.

At block 1415, the device may transmit a HARQ response message based at least in part on the HARQ timing as described with reference to FIGS. 2-4. In certain examples, the operations of block 1415 may be performed by the HARQ response module 615 as described with reference to FIG. 6.

At block 1420, the device may determine a HARQ synchronization error as described with reference to FIGS. 2-4. In certain examples, the operations of block 1420 may be performed by the HARQ synchronization module 715 as described with reference to FIG. 7.

At block 1425, the device may select a default HARQ timing based at least in part on the HARQ synchronization error determination as described with reference to FIGS. 2-4. In certain examples, the operations of block 1425 may be performed by the HARQ timing module 610 as described with reference to FIG. 6.

Figure 15:
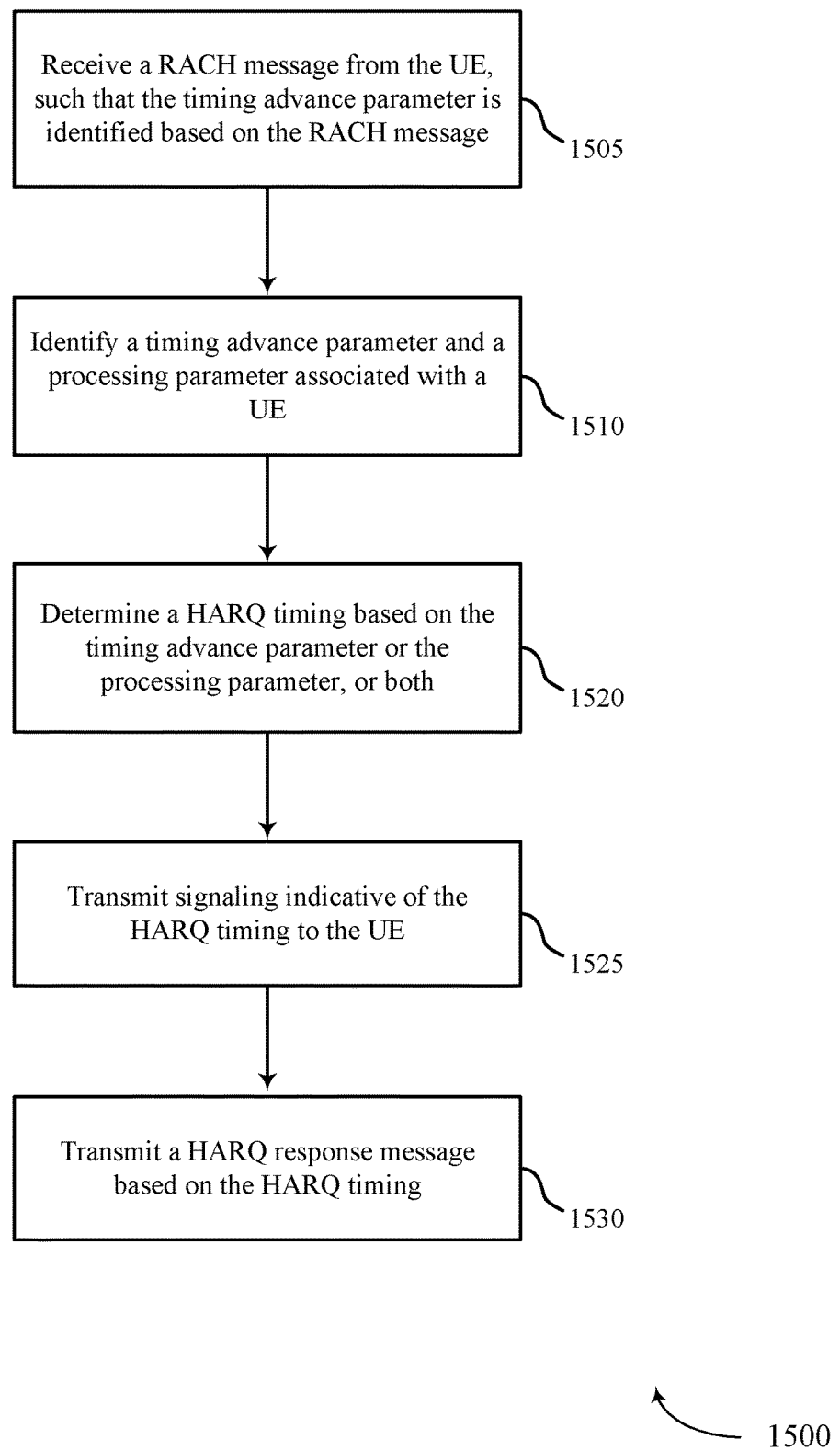

FIG. 15 shows a flowchart illustrating a method 1500 for low latency operation with different HARQ timing in accordance with various aspects of the present disclosure. The operations of method 1500 may be implemented by a base station 105 or its components as described with reference to FIGS. 1-9. For example, the operations of method 1500 may be performed by the low latency HARQ timing module 510 as described with reference to FIGS. 5-8. In some examples, a base station 105 may execute a set of codes to control the functional elements of the base station 105 to perform the functions described below. Additionally or alternatively, the base station 105 may perform aspects the functions described below using special-purpose hardware. The method 1500 may also incorporate aspects of methods 1000, 1100, 1200, 1300, and 1400 of FIGS. 10-14.

At block 1505, the base station 105 may receive a RACH message from a UE, such that a timing advance parameter is identified based at least in part on the RACH message as described with reference to FIGS. 2-4. In certain examples, the operations of block 1505 may be performed by the RACH module 720 as described with reference to FIG. 7.

At block 1510, the base station 105 may identify a timing advance parameter and a processing parameter associated with a UE as described with reference to FIGS. 2-4. In certain examples, the operations of block 1510 may be performed by the timing parameter module 605 as described with reference to FIG. 6.

At block 1515, the base station 105 may determine a HARQ timing based at least in part on the timing advance parameter or the processing parameter, or both as described with reference to FIGS. 2-4. In certain examples, the operations of block 1515 may be performed by the HARQ timing module 610 as described with reference to FIG. 6.

At block 1520, the base station 105 may transmit signaling indicative of the HARQ timing to the UE as described with reference to FIGS. 2-4. In certain examples, the operations of block 1520 may be performed by the transmitter 515 as described with reference to FIG. 5.

At block 1525, the base station 105 may transmit a HARQ response message based at least in part on the HARQ timing as described with reference to FIGS. 2-4. In certain examples, the operations of block 1525 may be performed by the HARQ response module 615 as described with reference to FIG. 6.

Figure 16:
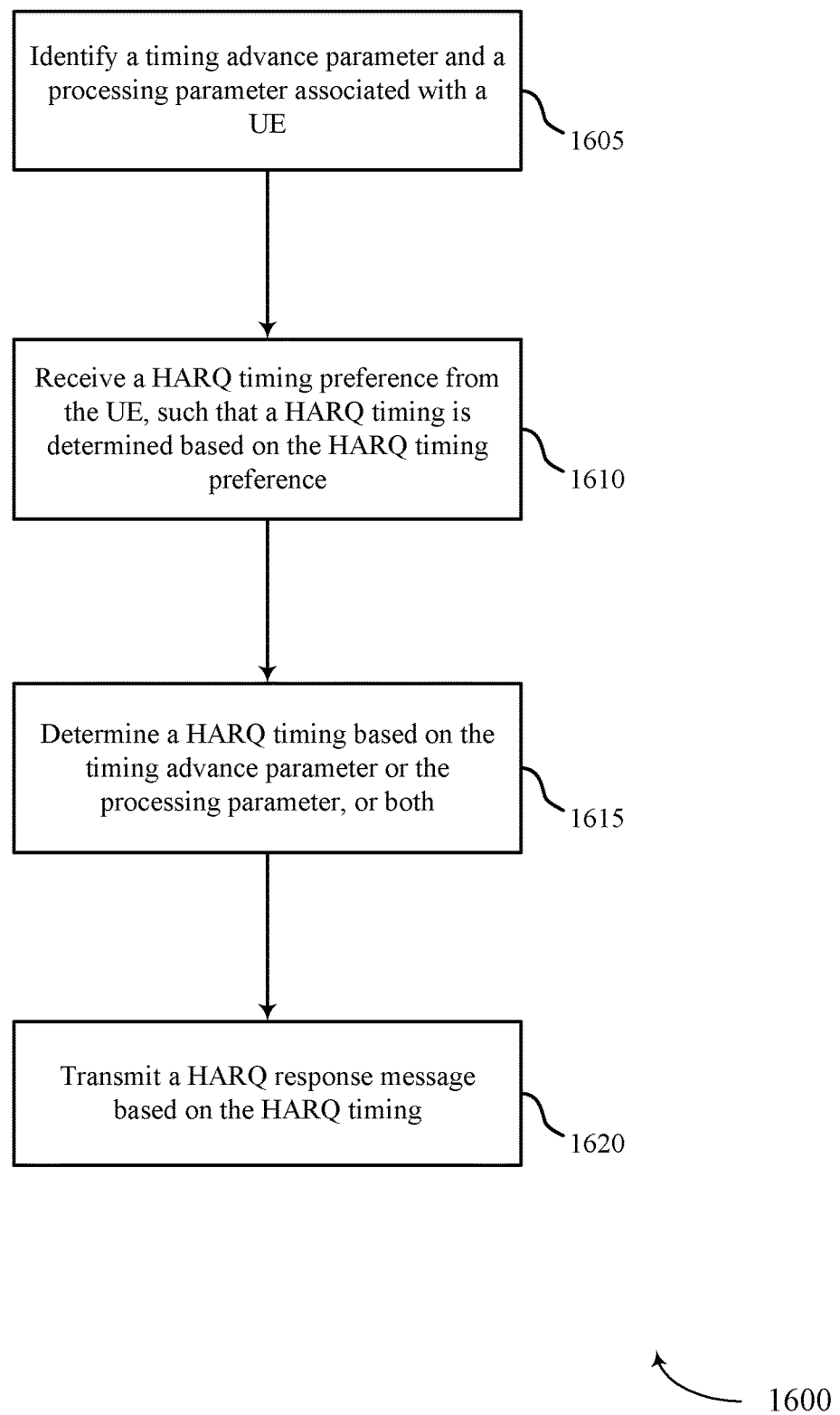

FIG. 16 shows a flowchart illustrating a method 1600 for low latency operation with different HARQ timing in accordance with various aspects of the present disclosure. The operations of method 1600 may be implemented by a base station 105 or its components as described with reference to FIGS. 1-9. For example, the operations of method 1600 may be performed by the low latency HARQ timing module 510 as described with reference to FIGS. 5-8. In some examples, a base station 105 may execute a set of codes to control the functional elements of the base station 105 to perform the functions described below. Additionally or alternatively, the base station 105 may perform aspects the functions described below using special-purpose hardware. The method 1600 may also incorporate aspects of methods 1000, 1100, 1200, 1300, 1400, and 1500 of FIGS. 10-15.

At block 1605, the base station 105 may identify a timing advance parameter and a processing parameter associated with a UE as described with reference to FIGS. 2-4. In certain examples, the operations of block 1605 may be performed by the timing parameter module 605 as described with reference to FIG. 6.

At block 1610, the base station 105 may receive a HARQ timing preference from the UE, such that a HARQ timing is determined based at least in part on the HARQ timing preference as described with reference to FIGS. 2-4. In certain examples, the operations of block 1610 may be performed by the timing preference module 710 as described with reference to FIG. 7.

At block 1615, the base station 105 may determine a HARQ timing based at least in part on the timing advance parameter or the processing parameter, or both as described with reference to FIGS. 2-4. In certain examples, the operations of block 1615 may be performed by the HARQ timing module 610 as described with reference to FIG. 6.

At block 1620, the base station 105 may transmit a HARQ response message based at least in part on the HARQ timing as described with reference to FIGS. 2-4. In certain examples, the operations of block 1620 may be performed by the HARQ response module 615 as described with reference to FIG. 6.

Figure 17:
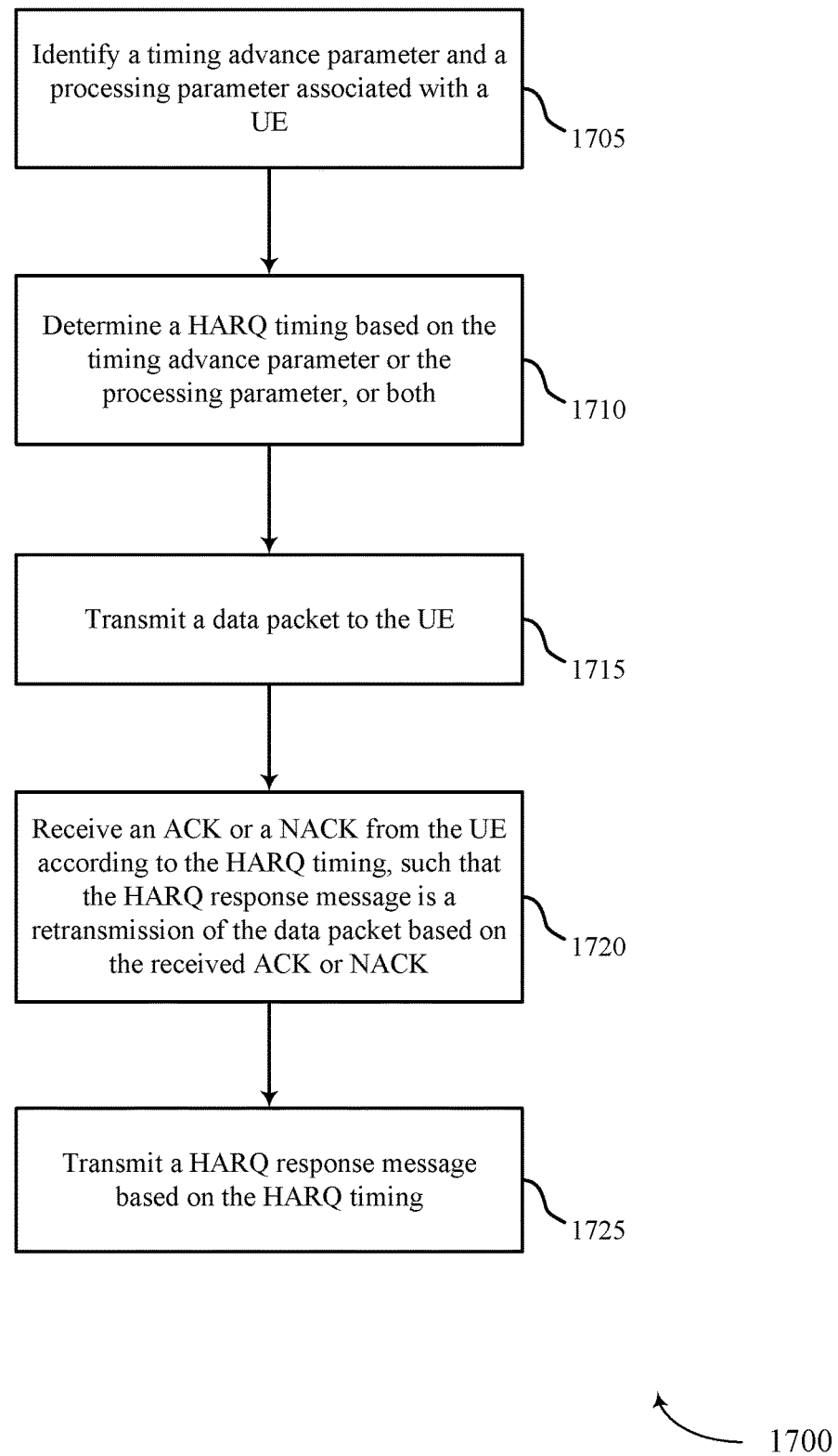

FIG. 17 shows a flowchart illustrating a method 1700 for low latency operation with different HARQ timing in accordance with various aspects of the present disclosure. The operations of method 1700 may be implemented by a base station 105 or its components as described with reference to FIGS. 1-9. For example, the operations of method 1700 may be performed by the low latency HARQ timing module 510 as described with reference to FIGS. 5-8. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1000, 1100, 1200, 1300, 1400, 1500, and 1600 of FIGS. 10-16.

At block 1705, the base station 105 may identify a timing advance parameter and a processing parameter associated with a UE as described with reference to FIGS. 2-4. In certain examples, the operations of block 1705 may be performed by the timing parameter module 605 as described with reference to FIG. 6.

At block 1710, the base station 105 may determine a HARQ timing based at least in part on the timing advance parameter or the processing parameter, or both as described with reference to FIGS. 2-4. In certain examples, the operations of block 1710 may be performed by the HARQ timing module 610 as described with reference to FIG. 6.

At block 1715, the base station 105 may transmit a data packet to the UE as described with reference to FIGS. 2-4. In certain examples, the operations of block 1715 may be performed by the transmitter 515 as described with reference to FIG. 5.

At block 1720, the base station 105 may receive an ACK or a NACK from the UE according to the HARQ timing, such that the HARQ response message is a retransmission of the data packet based at least in part on the received ACK or NACK as described with reference to FIGS. 2-4. In certain examples, the operations of block 1720 may be performed by the HARQ response module 615 as described with reference to FIG. 6.

At block 1725, the base station 105 may transmit a HARQ response (i.e., retransmission) message based at least in part on the HARQ timing as described with reference to FIGS. 2-4. In certain examples, the operations of block 1725 may be performed by the HARQ response module 615 as described with reference to FIG. 6.

Thus, methods 1000, 1100, 1200, 1300, 1400, 1500, 1600, and 1700 may provide for low latency operation with different HARQ timing. It should be noted that methods 1000, 1100, 1200, 1300, 1400, 1500, 1600, and 1700 describe possible implementation, and that the operations and the steps may be rearranged or otherwise modified such that other implementations are possible. In some examples, aspects from two or more of the methods 1000, 1100, 1200, 1300, 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   identifying, at a user equipment (UE), at least one of a timing advance parameter or a processing parameter associated with the UE;
   determining a hybrid automatic repeat request (HARQ) timing based at least in part on the timing advance parameter or the processing parameter, or both, wherein the HARQ timing comprises a response time between transmitting an uplink message and receiving HARQ feedback;
   transmitting a HARQ timing preference to a serving cell, wherein the HARQ timing preference is based at least in part on the determined HARQ timing; and
   receiving, from the serving cell, HARQ feedback based at least in part on the HARQ timing.

2. The method of claim 1,
   wherein the HARQ timing preference comprises a timing advance update, wherein the HARQ feedback is received based at least in part on the timing advance update.

3. The method of claim 1, wherein the processing parameter is associated with a processing capability of the UE or a processing load of the UE, or both.

4. The method of claim 1, further comprising:
   receiving signaling indicative of the HARQ timing from a serving cell, wherein the HARQ timing is determined based at least in part on the signaling.

5. The method of claim 1, further comprising:
   identifying a set of timing advance threshold values, wherein the HARQ timing is determined based at least in part on the set of timing advance threshold values.

6. The method of claim 5, wherein the set of timing advance threshold values comprises a hysteresis value, and wherein the timing advance parameter is limited to a set duration offset based at least in part on the hysteresis value.

7. The method of claim 1, further comprising:
   determining a HARQ synchronization error; and
   selecting a default HARQ timing based at least in part on the HARQ synchronization error determination.

8. The method of claim 1, wherein the timing advance parameter is identified based at least in part on past timing advance commands or scheduling needs, or both.

9. The method of claim 1, wherein the HARQ timing is based at least in part on low latency operation.

10. The method of claim 9, wherein the low latency operation is based at least in part on a transmission time interval (TTI) duration.

11. The method of claim 1, wherein the HARQ timing is based at least in part on a number of configured component carriers (CCs), a number of scheduled CCs, a bandwidth of configured CCs, a bandwidth of scheduled CCs, or any combination thereof.

12. An apparatus for wireless communication, comprising:
    means for identifying, at a user equipment (UE), at least one of a timing advance parameter or a processing parameter associated with the UE;
    means for determining a hybrid automatic repeat request (HARQ) timing based at least in part on the timing advance parameter or the processing parameter, or both, wherein the HARQ timing comprises a response time between transmitting an uplink message and receiving HARQ feedback;
    means for transmitting a HARQ timing preference to a serving cell, wherein the HARQ timing preference is based at least in part on the determined HARQ timing; and
    means for receiving, from the serving cell, HARQ feedback based at least in part on the HARQ timing.

13. The apparatus of claim 12,
    wherein the HARQ timing preference comprises a timing advance update, wherein the HARQ feedback is received based at least in part on the timing advance update.

14. The apparatus of claim 12, wherein the processing parameter is associated with a processing capability of the UE or a processing load of the UE, or both.

15. The apparatus of claim 12, further comprising:
    means for receiving signaling indicative of the HARQ timing from a serving cell, wherein the HARQ timing is determined based at least in part on the signaling.

16. The apparatus of claim 12, further comprising:
    means for receiving a random access channel (RACH) message from the UE, wherein the timing advance parameter is identified based at least in part on the RACH message.

17. The apparatus of claim 12, further comprising:
means for transmitting signaling indicative of the HARQ timing to the UE.

18. An apparatus for wireless communication, comprising:
a processor;
memory in electronic communication with the processor; and
instructions stored in the memory and operable, when executed by the processor, to cause the apparatus to:
identify, at a user equipment (UE), at least one of a timing advance parameter or a processing parameter associated with the UE;
determine a hybrid automatic repeat request (HARQ) timing based at least in part on the timing advance parameter or the processing parameter, or both, wherein the HARQ timing comprises a response time between transmitting an uplink message and receiving HARQ feedback;
transmit a HARQ timing preference to a serving cell, wherein the HARQ timing preference is based at least in part on the determined HARQ timing; and
receive, from the serving cell, HARQ feedback based at least in part on the HARQ timing.

19. The apparatus of claim 18, wherein
wherein the HARQ timing preference comprises a timing advance update, wherein the HARQ feedback is received based at least in part on the timing advance update.

20. The apparatus of claim 18, wherein the processing parameter is associated with a processing capability of the UE or a processing load of the UE, or both.

21. The apparatus of claim 18, wherein the instructions are further executable by the processor to cause the apparatus to:
receive signaling indicative of the HARQ timing from a serving cell, wherein the HARQ timing is determined based at least in part on the signaling.

22. The apparatus of claim 18, wherein the instructions are further executable by the processor to cause the apparatus to:
receive a random access channel (RACH) message from the UE, wherein the timing advance parameter is identified based at least in part on the RACH message.

23. The apparatus of claim 18, wherein the instructions are further executable by the processor to cause the apparatus to:
transmit signaling indicative of the HARQ timing to the UE.

24. A non-transitory computer-readable medium storing code for wireless communication, the code comprising instructions executable to:
identify, at a user equipment (UE), at least one of a timing advance parameter or a processing parameter associated with the UE;
determine a hybrid automatic repeat request (HARQ) timing based at least in part on the timing advance parameter or the processing parameter, or both, wherein the HARQ timing comprises a response time between transmitting an uplink message and receiving HARQ feedback;
transmit a HARQ timing preference to a serving cell, wherein the HARQ timing preference is based at least in part on the determined HARQ timing; and
receive, from the serving cell, HARQ feedback based at least in part on the HARQ timing.

* * * * *